(12) United States Patent
Harada et al.

(10) Patent No.: US 11,053,667 B2
(45) Date of Patent: Jul. 6, 2021

(54) CONTROL SYSTEM FOR WORK VEHICLE, METHOD FOR SETTING TRAJECTORY OF WORK IMPLEMENT, AND WORK VEHICLE

(71) Applicant: KOMATSU LTD., Tokyo (JP)

(72) Inventors: Junji Harada, Tokyo (JP); Eiji Ishibashi, Tokyo (JP); Takahiro Shimojo, Tokyo (JP)

(73) Assignee: KOMATSU LTD., Tokyo (JP)

( * ) Notice: Subject to any disclaimer, the term of this patent is extended or adjusted under 35 U.S.C. 154(b) by 187 days.

(21) Appl. No.: 16/469,403

(22) PCT Filed: Feb. 22, 2018

(86) PCT No.: PCT/JP2018/006382
§ 371 (c)(1),
(2) Date: Jun. 13, 2019

(87) PCT Pub. No.: WO2018/159435
PCT Pub. Date: Sep. 7, 2018

(65) Prior Publication Data
US 2019/0352886 A1    Nov. 21, 2019

(30) Foreign Application Priority Data

Mar. 2, 2017 (JP) .............................. JP2017-039798

(51) Int. Cl.
*E02F 9/26* (2006.01)
*E02F 3/84* (2006.01)
*G05D 1/02* (2020.01)

(52) U.S. Cl.
CPC .............. *E02F 9/262* (2013.01); *E02F 3/844* (2013.01); *G05D 1/0212* (2013.01); *G05D 2201/0202* (2013.01)

(58) Field of Classification Search
CPC ........ E02F 9/262; E02F 3/844; G05D 1/0212; G05D 2201/0202
USPC ............................................................ 701/50
See application file for complete search history.

(56) References Cited

U.S. PATENT DOCUMENTS

| 5,854,988 A * | 12/1998 | Davidson .................. E02F 9/26 |
| | | 701/50 |
| 2013/0006484 A1* | 1/2013 | Avitzur ................ G05D 1/0274 |
| | | 701/50 |
| 2013/0081831 A1* | 4/2013 | Hayashi .................. E02F 3/847 |
| | | 172/4.5 |

(Continued)

FOREIGN PATENT DOCUMENTS

| JP | 2006-249883 A | 9/2006 |
| JP | 2007-77800 A | 3/2007 |

(Continued)

OTHER PUBLICATIONS

The International Search Report for the corresponding international application No. PCT/JP2018/006382, dated May 29, 2018.

*Primary Examiner* — Yazan A Soofi
(74) *Attorney, Agent, or Firm* — Global IP Counselors, LLP

(57) ABSTRACT

A work vehicle includes a work implement. A control system for the work vehicle includes a controller. The controller acquires actual topography data indicating an actual surface of a work target. The controller vertically displaces a target design surface using the actual surface as a reference.

20 Claims, 28 Drawing Sheets

(56) References Cited

U.S. PATENT DOCUMENTS

| | | | | |
|---|---|---|---|---|
| 2014/0180444 | A1* | 6/2014 | Edara | E02F 3/841 |
| | | | | 700/56 |
| 2016/0002882 | A1* | 1/2016 | Kanari | E02F 9/2033 |
| | | | | 701/50 |
| 2016/0076223 | A1* | 3/2016 | Wei | E02F 9/205 |
| | | | | 701/50 |
| 2016/0312434 | A1* | 10/2016 | Shintani | E02F 3/43 |

FOREIGN PATENT DOCUMENTS

| | | |
|---|---|---|
| JP | 2012-255286 A | 12/2012 |
| JP | 5247939 B1 | 7/2013 |
| JP | 2015-55109 A | 3/2015 |

* cited by examiner

CONTROL SYSTEM FOR WORK VEHICLE, METHOD FOR SETTING TRAJECTORY OF WORK IMPLEMENT, AND WORK VEHICLE

CROSS-REFERENCE TO RELATED APPLICATIONS

This application is a U.S. National stage application of International Application No. PCT/JP2018/006382, filed on Feb. 22, 2018. This U.S. National stage application claims priority under 35 U.S.C. § 119(a) to Japanese Patent Application No. 2017-039798, filed in Japan on Mar. 2, 2017, the entire contents of which are hereby incorporated herein by reference.

BACKGROUND

Fields of the Invention

The present invention relates to a control system for a work vehicle, a method for setting a trajectory of a work implement, and a work vehicle.

Background Information

An automatic control for automatically adjusting the position of a work implement has been conventionally proposed for work vehicles such as bulldozers or graders and the like. For example, Japanese Patent Publication No. 5247939 discloses digging control and leveling control.

Under the digging control, the position of the blade is automatically adjusted such that the load applied to the blade coincides with a target load. Under the leveling control, the position of the blade is automatically adjusted so that the tip of the blade moves along a final design surface indicating a target shape of the digging target.

SUMMARY

With the conventional control mentioned above, the occurrence of shoe slip can be suppressed by raising the blade when the load on the blade becomes excessively high. This allows the work to be performed efficiently.

However, with the conventional control, as shown in FIG. 29, the blade is first controlled to conform to a final design surface 100. If the load on the blade subsequently increases, the blade is raised by load control (see a trajectory 200 of the blade in FIG. 29). Therefore, when digging a topography 300 with large undulations, the load applied to the blade may increase rapidly, causing the blade to rise suddenly. If that happens, a very uneven topography will be formed, making it difficult to perform digging work smoothly. Also, there is a concern that the topography being excavated will be prone to becoming rough and the finish quality will suffer.

Work conducted by a work vehicle includes filling work as well as digging work. During filling work, the work vehicle removes soil from a cut earth part with the work implement. Then, the work vehicle piles the removed soil in a predetermined position with the work implement. Soil is compacted by rollers or by traveling of the work vehicle over the piled soil. As a result, for example, a depressed topography is filled in and a flat shape can be formed.

However, it is difficult to perform desirable filling work under the aforementioned automatic controls. For example, as indicated in FIG. 30, under the leveling control, the position of the blade is automatically adjusted so that the tip of the blade moves along the final design surface 100. As a result, when the filling work is performed on the topography 300 with large undulations under the leveling control, a large amount of soil is piled at one time in a position in front of the work vehicle as illustrated by a dashed line 400 in FIG. 30. In this case, it is difficult to compact the piled soil because the height of the piled soil is too large. As a result, there is a problem that the quality of the finished work is poor.

An object of the present invention is to provide a control system for a work vehicle, a method for setting a trajectory of a work implement, and a work vehicle that enable work with high efficiency and high quality finish under automatic control.

A control system according to a first aspect is a control system for a work vehicle including a work implement. The control system includes a controller. The controller is programmed to execute the following processing. The controller acquires actual topography data indicating an actual surface of a work target. The controller vertically displaces a target design surface using the actual surface as a reference.

A method according to a second aspect is a method for setting a target trajectory of a work implement of a work vehicle. The method for setting the target trajectory includes the following processes. A first process is to acquire actual topography data indicating an actual surface of a work target. A second process is to vertically displace a target design surface using the actual surface as a reference.

A work vehicle according to a third aspect is a work vehicle including a work implement and a controller. The controller is programmed to execute the following processing. The controller acquires actual topography data indicating an actual surface of a work target. The controller vertically displaces a target design surface using the actual surface as a reference.

According to the present invention, a target design surface is vertically displaced using an actual surface as a reference. For example, when the target design surface is positioned above the actual surface, soil can be piled thinly on the actual surface by controlling the work implement along the target design surface. When the target design surface is positioned below the actual surface, digging can be performed while suppressing excessive load to the work implement by controlling the work implement along the target design surface. Accordingly, the quality of the finished work can be improved. Moreover, work efficiency can be improved by automatic control.

DETAILED DESCRIPTION OF EMBODIMENT(S)

Figure 1:
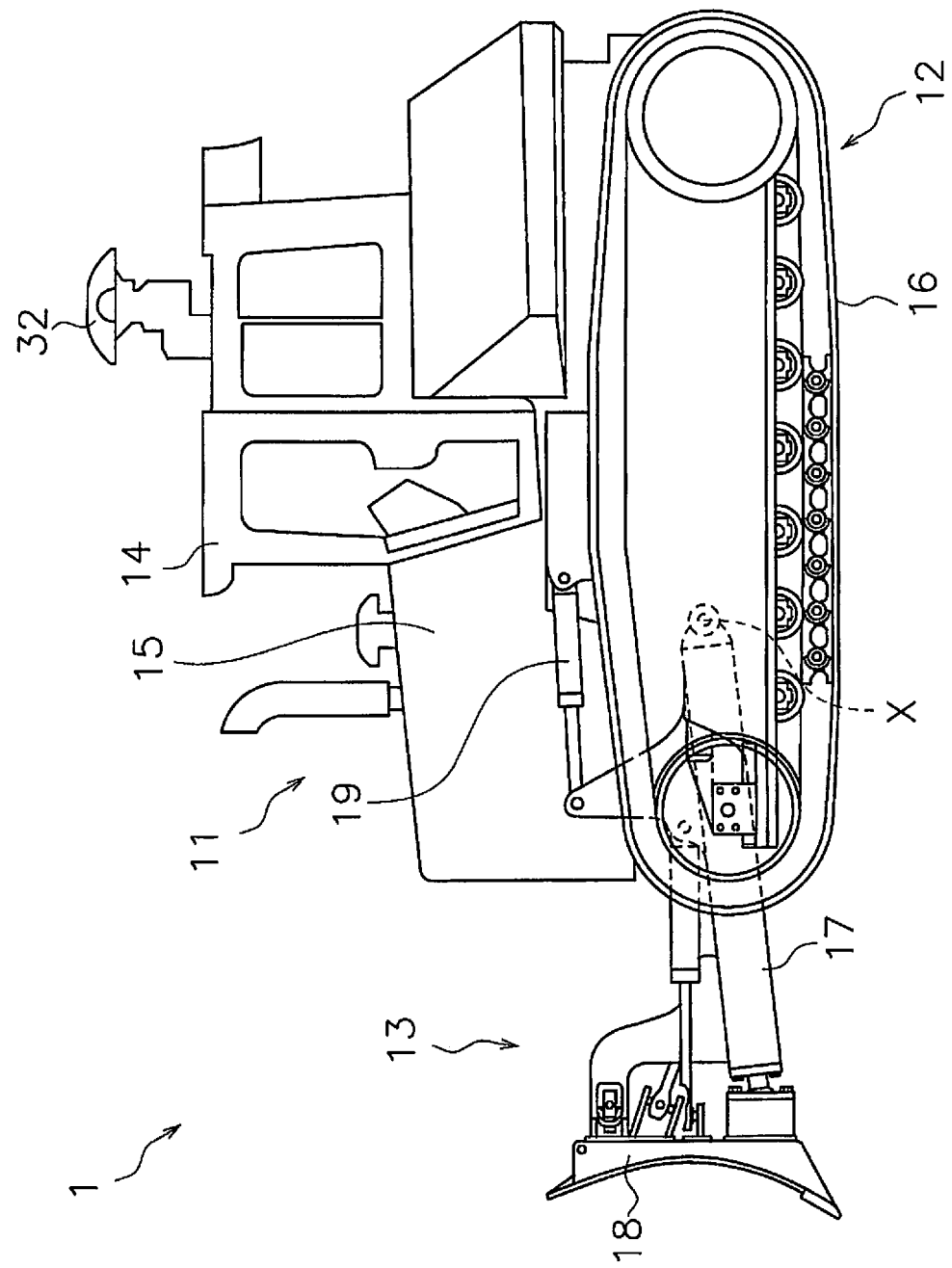
FIG. 1 is a side view of a work vehicle according to an embodiment.

A work vehicle according to an embodiment will now be described below in detail with reference to the drawings. FIG. 1 is a side view of a work vehicle 1 according to an embodiment. The work vehicle 1 according to the present embodiment is a bulldozer. The work vehicle 1 includes a vehicle body 11, a travel device 12, and a work implement 13.

The vehicle body 11 includes an operating cabin 14 and an engine compartment 15. An operator's seat that is not illustrated is disposed inside the operating cabin 14. The engine compartment 15 is disposed in front of the operating cabin 14. The travel device 12 is attached to a bottom portion of the vehicle body 11. The travel device 12 includes a pair of left and right crawler belts 16. Only the left crawler belt 16 is illustrated in FIG. 1. The work vehicle 1 travels due to the rotation of the crawler belts 16. The travel of the work vehicle 1 may be either autonomous travel, semi-autonomous travel, or travel under operation by an operator.

The work implement 13 is attached to the vehicle body 11. The work implement 13 includes a lift frame 17, a blade 18, and a lift cylinder 19.

The lift frame 17 is attached to the vehicle body 11 in a manner that allows movement up and down centered on an axis X that extends in the vehicle width direction. The lift frame 17 supports the blade 18. The blade 18 is disposed in front of the vehicle body 11. The blade 18 moves up and down as the lift frame 17 moves up and down.

The lift cylinder 19 is coupled to the vehicle body 11 and the lift frame 17. Due to the extension and contraction of the lift cylinder 19, the lift frame 17 rotates up and down centered on the axis X.

Figure 2:
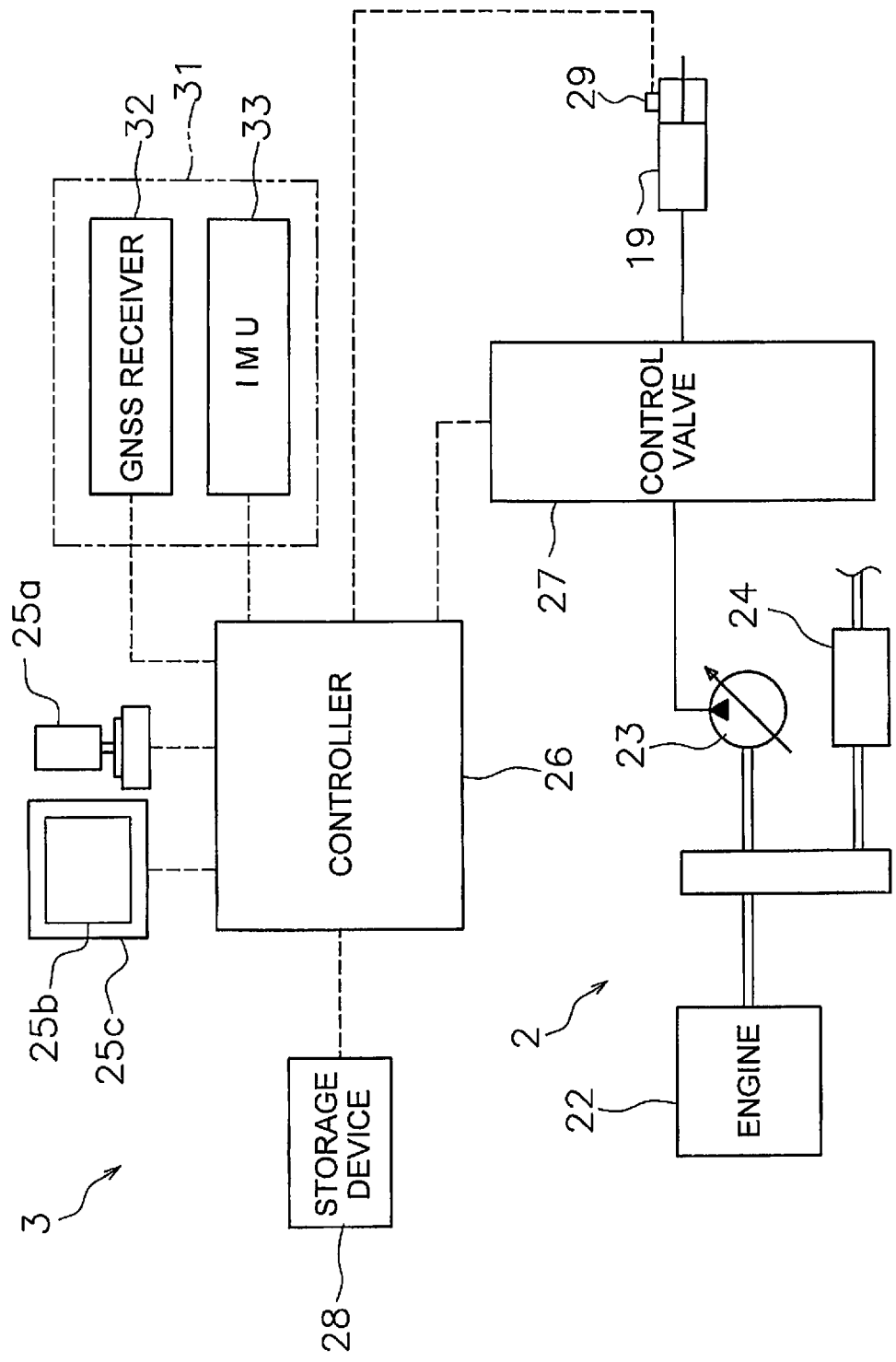
FIG. 2 is a block diagram of a drive system and a control system of the work vehicle.

FIG. 2 is a block diagram illustrating a configuration of a drive system 2 and a control system 3 of the work vehicle 1. As illustrated in FIG. 2, the drive system 2 includes an engine 22, a hydraulic pump 23, and a power transmission device 24.

The hydraulic pump 23 is driven by the engine 22 to discharge hydraulic fluid. The hydraulic fluid discharged from the hydraulic pump 23 is supplied to the lift cylinder 19. While only one hydraulic pump 23 is illustrated in FIG. 2, a plurality of hydraulic pumps may be provided.

The power transmission device 24 transmits driving power from the engine 22 to the travel device 12. The power transmission device 24 may be a hydro static transmission (HST), for example. Alternatively, the power transmission device 24 may be, for example, a torque converter or a transmission having a plurality of speed change gears.

The control system 3 includes an operating device 25a, an input device 25b, a display 25c, a controller 26, a control valve 27, and a storage device 28. The operating device 25a is a device for operating the work implement 13 and the travel device 12. The operating device 25a is disposed in the operating cabin 14. The operating device 25a receives operations by the operator for driving the work implement 13 and the travel device 12, and outputs operation signals corresponding to the operations. The operating device 25a includes, for example, an operating lever, a pedal, a switch and the like.

For example, the operating device 25a for the travel device 12 is configured to be operable at a forward position, a reverse position, and a neutral position. An operation signal indicating the position of the operating device 25a is output to the controller 26. The controller 26 controls the travel device 12 or the power transmission device 24 so that the work vehicle 1 moves forward when the operating position of the operating device 25a is in the forward position. The controller 26 controls the travel device 12 or the power transmission device 24 so that the work vehicle 1 moves in reverse when the operating position of the operating device 25a is the reverse position.

The input device 25b and the display 25c are touch panel-type display input devices, for example. The display 25c is, for example, an LCD or an OLED. However, the display 25c may be another type of display device. The input device 25b and the display 25c may be separate devices. The input device 25b may be another input device such as a switch, for example. The input device 25b outputs an operation signal indicating an operation by the operator to the controller 26.

The controller 26 is programmed to control the work vehicle 1 based on acquired data. The controller 26 includes, for example, a processor such as a CPU. The controller 26 acquires operation signals from the operating device 25a.

The controller 26 controls the control valve 27 based on the operation signals. The controller 26 acquires the operation signals from the input device 25b. The controller 26 outputs a signal to display a predetermined screen on the display 25c.

The control valve 27 is a proportional control valve and is controlled by command signals from the controller 26. The control valve 27 is disposed between a hydraulic actuator such as the lift cylinder 19 and the hydraulic pump 23. The control valve 27 controls the flow rate of the hydraulic fluid supplied from the hydraulic pump 23 to the lift cylinder 19. The controller 26 generates a command signal to the control valve 27 so that the blade 18 acts in accordance with the aforementioned operations of the operating device 25a. As a result, the lift cylinder 19 is controlled in response to the operation amount of the operating device 25a. The control valve 27 may be a pressure proportional control valve. Alternatively, the control valve 27 may be an electromagnetic proportional control valve.

Figure 3:
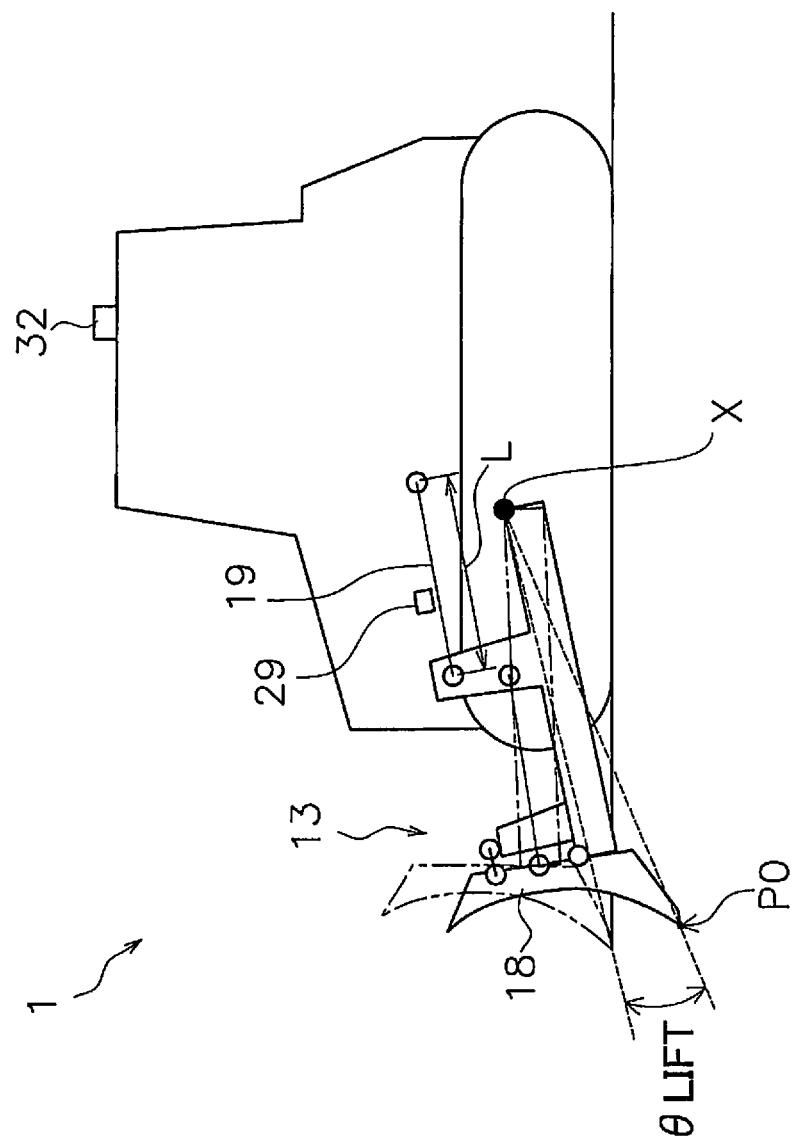
FIG. 3 is a schematic view of a configuration of the work vehicle.

The control system 3 includes a lift cylinder sensor 29. The lift cylinder sensor 29 detects the stroke length (hereinafter referred to as "lift cylinder length L") of the lift cylinder 19. As illustrated in FIG. 3, the controller 26 calculates a lift angle θlift of the blade 18 based on the lift cylinder length L. FIG. 3 is a schematic view of a configuration of the work vehicle 1.

The origin position of the work implement 13 is illustrated as a chain double-dashed line in FIG. 3. The origin position of the work implement 13 is the position of the blade 18 while the tip of the blade 18 is in contact with the ground surface on a horizontal ground surface. The lift angle θlift is the angle from the origin position of the work implement 13.

As illustrated in FIG. 2, the control system 3 includes a position sensing device 31. The position sensing device 31 detects the position of the work vehicle 1. The position sensing device 31 includes a global navigation satellite system (GNSS) receiver 32 and an IMU 33. The GNSS receiver 32 is, for example, a receiver for global positioning system (GPS). An antenna of the GNSS receiver 32 is disposed on the operating cabin 14. The GNSS receiver 32 receives positioning signals from a satellite and calculates the position of the antenna based on the positioning signals to generate vehicle body position data. The controller 26 acquires vehicle body position data from the GNSS receiver 32.

The IMU 33 is an inertial measurement unit. The IMU 33 acquires vehicle body inclination angle data and vehicle body acceleration data. The vehicle body inclination angle data includes the angle (pitch angle) relative to horizontal in the vehicle longitudinal direction and the angle (roll angle) relative to horizontal in the vehicle lateral direction. The vehicle body acceleration data includes the acceleration of work vehicle 1. The controller 26 acquires the vehicle body inclination angle data and the vehicle body acceleration data from the IMU 33.

The controller 26 computes a blade tip position P0 from the lift cylinder length L, the vehicle body position data, and the vehicle body inclination angle data. As illustrated in FIG. 3, the controller 26 calculates global coordinates of the GNSS receiver 32 based on the vehicle body position data. The controller 26 calculates the lift angle θlift based on the lift cylinder length L. The controller 26 calculates the local coordinates of the blade tip position P0 with respect to the GNSS receiver 32 based on the lift angle θlift and the vehicle body dimension data.

The controller 26 calculates the traveling direction and the speed of the work vehicle 1 from the vehicle body position data and the vehicle body acceleration data. The vehicle body dimension data is stored in the storage device 28 and indicates the position of the work implement 13 with respect to the GNSS receiver 32. The controller 26 calculates the global coordinates of the blade tip position P0 based on the global coordinates of the GNSS receiver 32, and the local coordinates of the blade tip position P0, and the vehicle body inclination angle data. The controller 26 acquires the global coordinates of the blade tip position P0 as blade tip position data. The blade tip position P0 may be directly calculated by attaching the GNSS receiver to the blade 18.

The storage device 28 includes, for example, a memory and an auxiliary storage device. The storage device 28 may be a RAM, a ROM, for example. The storage device 28 may be a semiconductor memory, a hard disk, or the like. The storage device 28 is an example of a non-transitory computer-readable recording medium. The storage device 28 stores computer commands which are executable by a processor and for controlling the work vehicle 1.

The storage device 28 stores work site topography data. The work site topography data indicates an actual topography of a work site. The work site topography data is, for example, an actual surface survey in a three-dimensional data format. The work site topography data can be acquired by aerial laser survey, for example.

The controller 26 acquires actual topography data. The actual topography data indicates an actual surface 50 of a work site. The actual surface 50 is the topography of the region along the traveling direction of the work vehicle 1. The actual topography data is acquired by calculation by the controller 26 from the work site topography data, and the position and traveling direction of the work vehicle 1 acquired from the aforementioned position sensing device 31. Also, the actual topography data is acquired as the work vehicle 1 travels as described below.

Figure 4:
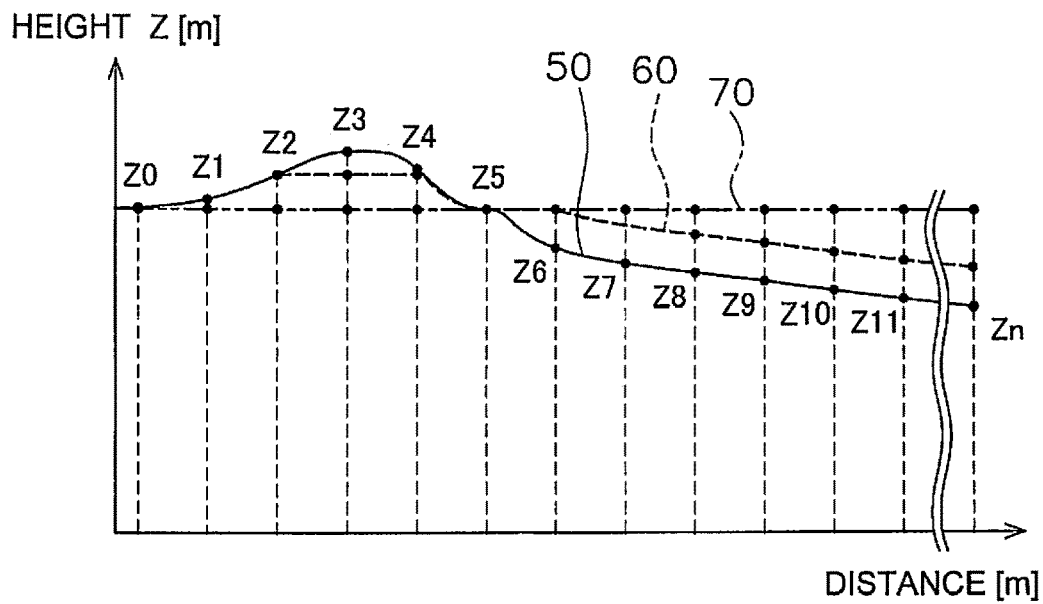
FIG. 4 illustrates an example of a design surface and an actual surface.

FIG. 4 illustrates an example of a cross section of the actual surface 50. As illustrated in FIG. 4, the actual topography data includes the height of the actual surface 50 at a plurality of reference points. Specifically, the actual topography data includes the heights Z0 to Zn of the actual surface 50 at a plurality of reference points in the traveling direction of the work vehicle 1. The plurality of reference points are arranged at a predetermined interval. The predetermined interval is one meter, for example, but may be another value.

In FIG. 4, the vertical axis indicates the height of the topography, and the horizontal axis indicates the distance from the current position in the traveling direction of the work vehicle 1. The current position may be a position determined based on the current blade tip position P0 of the work vehicle 1. The current position may be determined based on the current position of another portion of the work vehicle 1.

The storage device 28 stores design surface data. The design surface data indicates design surfaces 60 and 70 that are the target trajectories of the work implement 13. The storage device 28 stores a plurality of design surface data indicating a plurality of design surfaces 60 and 70.

As illustrated in FIG. 4, the design surface data includes the heights of the design surfaces 60 and 70 at a plurality of reference points as in the actual topography data. The plurality of the design surfaces 60 and 70 include a final design surface 70. The final design surface 70 is the final target shape of the surface of the work site. The final design surface 70 is, for example, a construction drawing in a three-dimensional data format, and is stored in advance in the storage device 28. In FIG. 4, the final design surface 70 has a flat shape parallel to the horizontal direction, but may have a different shape.

The plurality of design surfaces 60 and 70 includes an intermediate design surface 60 other than the final design surface 70. At least a portion of the design surface 60 is positioned between the final design surface 70 and the actual surface 50. The controller 26 can generate a desired design surface to generate the design surface data indicating the design surface 60, and store the design surface data in the storage device 28.

Figure 5:
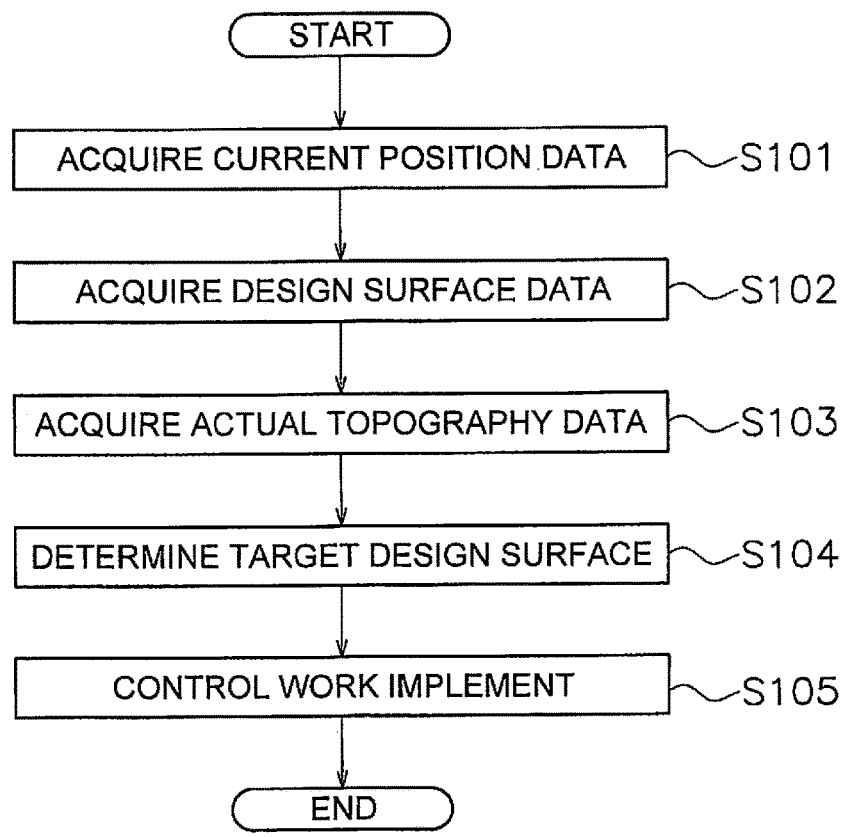
FIG. 5 is a flow chart illustrating automatic control processing of a work implement.

The controller 26 automatically controls the work implement 13 based on the actual topography data, the design surface data and the blade tip position data. The automatic control of the work implement 13 to be executed by the controller 26 will be described below. FIG. 5 is a flow chart illustrating automatic control processing of the work implement 13.

As illustrated in FIG. 5, in step S101, the controller 26 acquires current position data. At this time, the controller 26 acquires the current blade tip position P0 of the work implement 13 as described above. In step S102, the controller 26 acquires design surface data. The controller 26 acquires the design surface data from the storage device 28.

In step S103, the controller 26 acquires actual topography data. As described above, the controller 26 acquires the actual topography data from the work site topography data and the position and traveling direction of the work vehicle 1. In addition, the controller 26 acquires the actual topography data indicating the current actual surface 50 as the work vehicle 1 moves on the actual surface 50.

For example, the controller 26 acquires position data indicating the most recent trajectory of the blade tip position P0 as the actual topography data. The controller 26 updates the work site topography data based on the acquired actual topography data. Alternatively, the controller 26 may calculate the position of the bottom surface of the crawler belts 16 from the vehicle body position data and the vehicle body dimension data, and may acquire the position data indicating the trajectory of the bottom surface of the crawler belts 16 as the actual topography data.

Alternatively, the actual topography data may be generated from survey data measured by a survey device outside of the work vehicle 1. Aerial laser survey may be used as an external survey device, for example. Alternatively, the actual surface 50 may be imaged by a camera and the actual topography data may be generated from the image data captured by the camera. For example, aerial photographic survey using an unmanned aerial vehicle (UAV) may be used.

In step S104, the controller 26 determines a target design surface. The controller 26 determines the design surfaces 60 and 70 selected by the operator as the target design surface. Alternatively, the design surfaces 60 and 70 automatically selected or generated by the controller 26 may be determined as the target design surface.

In step S105, the controller 26 controls the work implement 13. The controller 26 automatically controls the work implement 13 according to the target design surface. Specifically, the controller 26 generates a command signal to the work implement 13 such that the blade tip position of the blade 18 moves toward the target design surface. The generated command signal is input to the control valve 27. As a result, the blade tip position P0 of the work implement 13 moves along the target design surface.

For example, when the target design surface is positioned above the actual surface 50, soil will be piled on the actual surface 50 with the work implement 13. When the target design surface is positioned below the actual surface 50, the actual surface 50 is dug with the work implement 13.

The controller 26 may start the control of the work implement 13 when a signal for operating the work implement 13 is output from the operating device 25a. The movement of the work vehicle 1 may be performed with manual operations of the operating device 25a by the operator. Alternatively, the movement of the work vehicle 1 may be performed automatically by a command signal from the controller 26.

The above processing is performed while the work vehicle 1 moves forward. For example, when the operating device 25a for the travel device 12 is in the forward position, the above processing is performed to automatically control the work implement 13. When the work vehicle 1 moves in reverse, the controller 26 stops the control of the work implement 13.

Next, an actual surface offset function under automatic control of the work implement 13 will be described. The actual surface offset function is a function that generates a target surface by replacing the actual surface 50 with the design surface 60, and vertically displaces the target design surface optionally.

Figure 6:
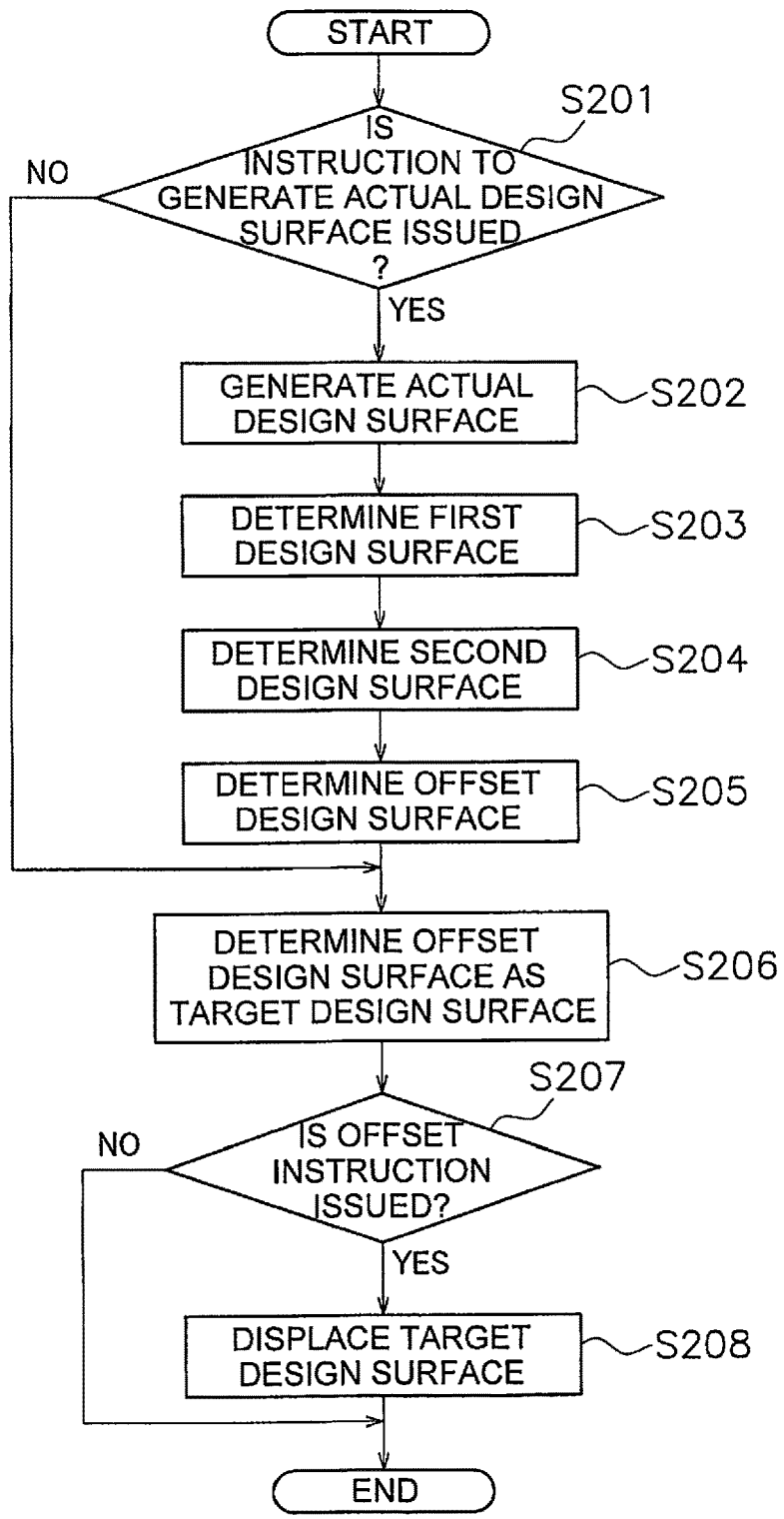
FIG. 6 is a flow chart illustrating processing of an actual surface offset function.
Figure 7:
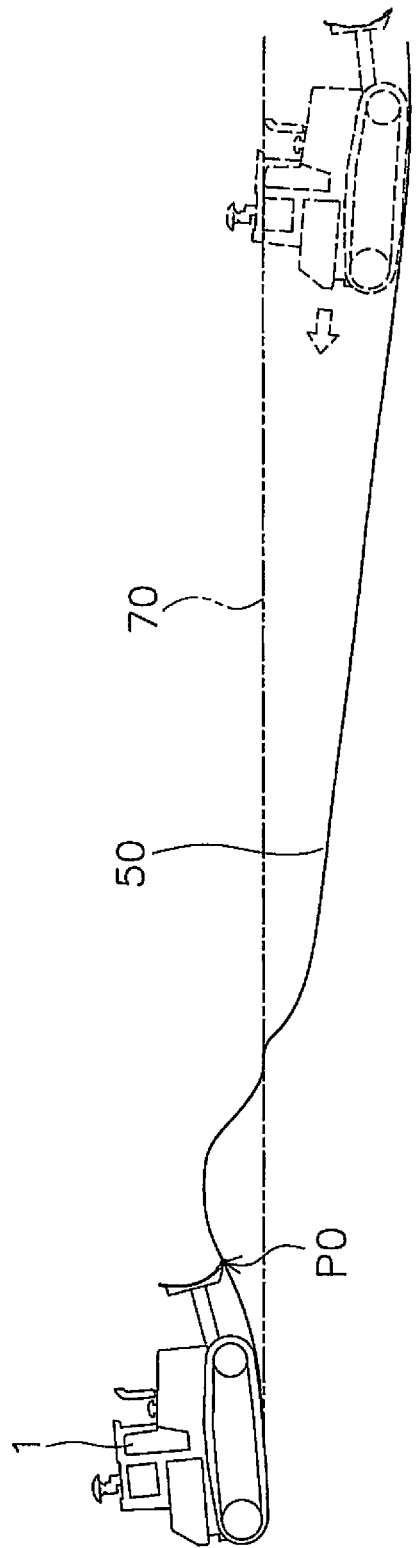
FIG. 7 illustrates an example of a design surface and an actual surface.

FIG. 6 is a flow chart illustrating processing of the actual surface offset function. Note that, as illustrated in FIG. 7, the work vehicle 1 travels on the actual surface 50, whereby the controller 26 acquires the actual topography data indicating the current actual surface 50.

As illustrated in FIG. 6, in step S201, the controller 26 determines whether an instruction to generate an actual design surface 61 is issued. The actual design surface 61 is a design surface generated from the actual surface 50 and has the same shape as the actual surface 50. As described later, when a signal indicating the instruction to generate the actual design surface 61 is output from the input device 25b by the operation of the input device 25b by the operator, the controller 26 determines that the instruction to generate the actual design surface 61 is issued. When it is determined that the instruction to generate the actual design surface 61 is issued, the process proceeds to step S202.

Figure 8:
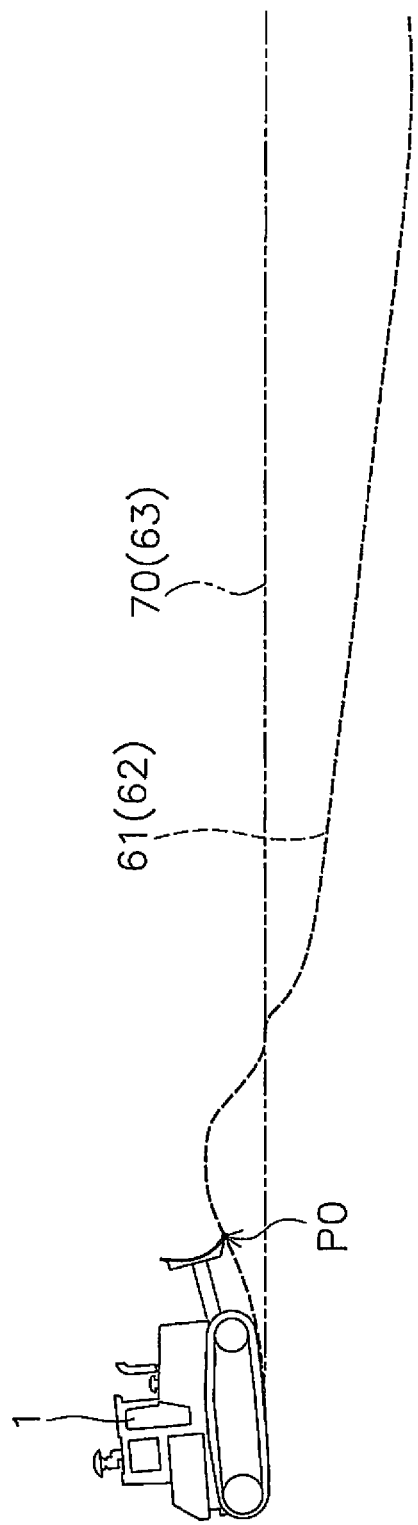
FIG. 8 illustrates an example of a design surface and an actual surface.

In step S202, the controller 26 generates actual design surface data. As illustrated in FIG. 8, the controller 26 replaces the actual surface 50 with the design surface, and generates the actual design surface data indicating the actual design surface 61 having the same shape as the actual surface 50. The controller 26 stores the generated actual design surface data in the storage device 28.

In step S203, the controller 26 determines the actual design surface 61 as a first design surface 62. In step S204, the controller 26 determines a second design surface data. The controller 26 selects a design surface selected from a plurality of the design surfaces 60 and 70 as a second design surface 63. The second design surface 63 may be selected by the operator. The second design surface 63 may be automatically selected by the controller 26. As illustrated in FIG. 8, herein it is assumed that the final design surface 70 is determined as the second design surface 63, as an example.

Figure 9:
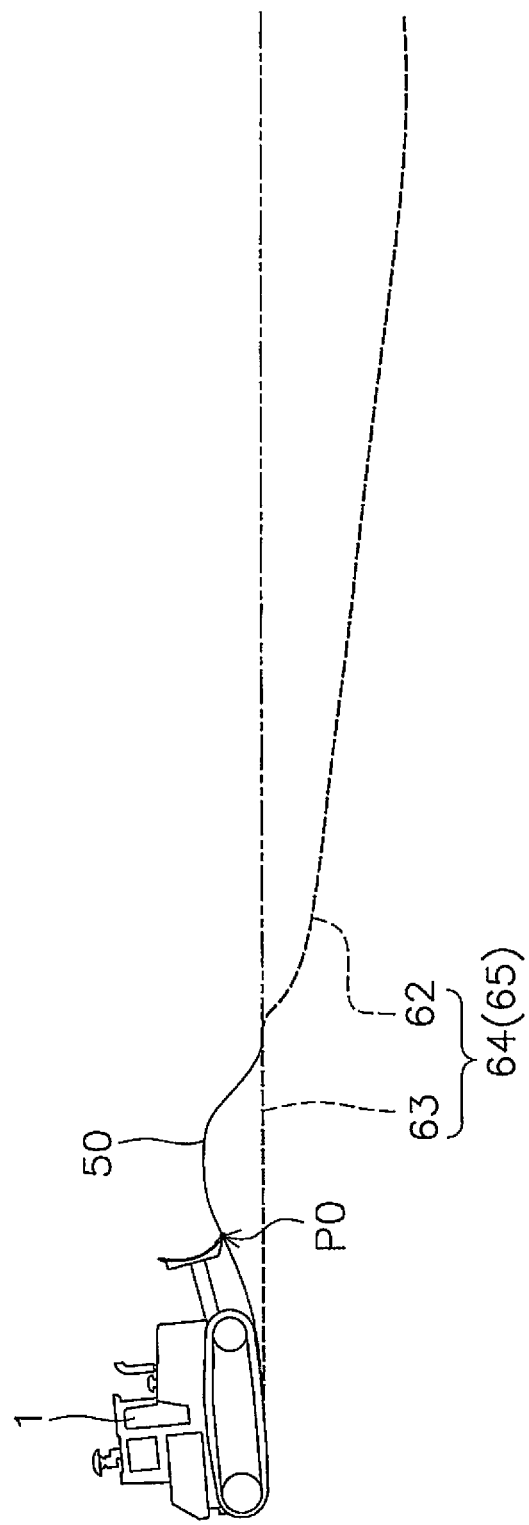
FIG. 9 illustrates an example of a design surface and an actual surface.

In step S205, the controller 26 determines an offset design surface 64. As illustrated in FIG. 9, the controller 26 selects portions that are lower among portions of the first design surface 62 and the second design surface 63 and combines them whereby determines the offset design surface 64. The controller 26 stores the design surface data indicating the determined offset design surface 64 in the storage device 28.

In step S206, the controller 26 determines the offset design surface 64 as a target design surface 65. The controller 26 may determine the offset design surface 64 as the target design surface 65 selected by the operator. Alternatively, the offset design surface 64 may be automatically determined as the target design surface 65 by the controller 26.

In step S207, the controller 26 determines whether an offset instruction is issued. Specifically, the input device 25*b* includes a raise key 41 and a lower key 42 as described later. The controller 26 determines whether the raise key 41 or the lower key 42 is operated. When the raise key 41 or the lower key 42 is operated, the controller 26 determines that the offset instruction is issued, and the process proceeds to step S208.

In step S208, the controller 26 vertically displaces the target design surface 65 according to an operation signal indicating the offset instruction from the input device 25*b*. Specifically, the controller 26 raises the target design surface 65 in response to the operation of the raise key 41. Alternatively, the controller 26 lowers the target design surface 65 in response to the operation of the lower key 42.

Figure 10:
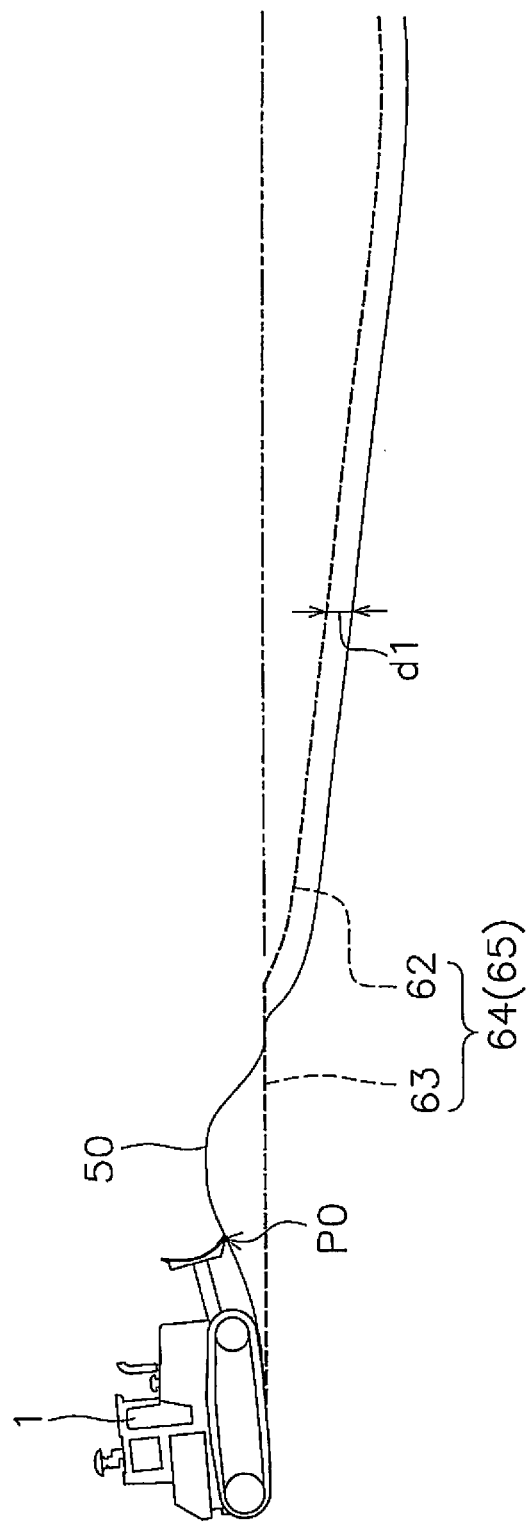
FIG. 10 illustrates an example of a design surface and an actual surface.
Figure 11:
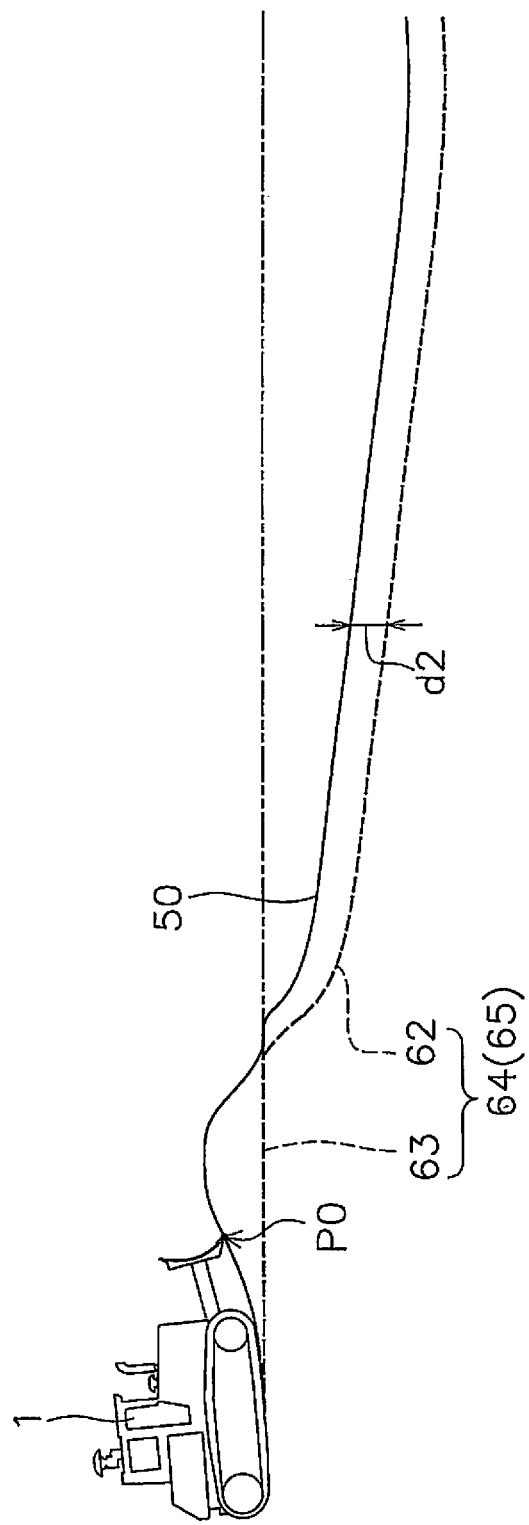
FIG. 11 illustrates an example of a design surface and an actual surface.
Figure 12:
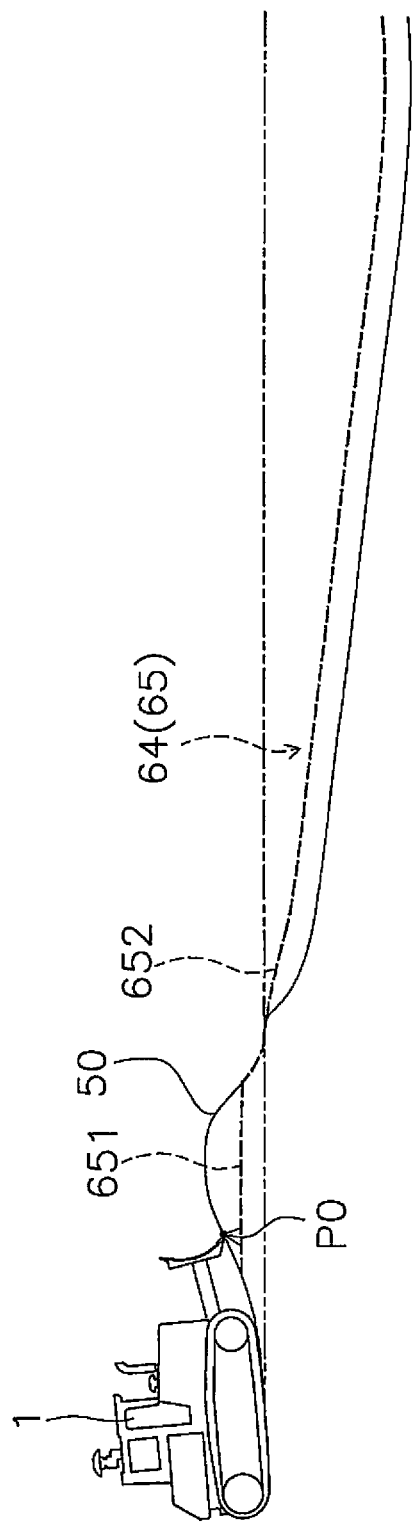
FIG. 12 illustrates an example of a design surface and an actual surface.

Specifically, as illustrated in FIG. 10, the controller 26 raises the first design surface 62 by a predetermined distance d1 every time the raise key 41 is pressed once. Similarly, as illustrated in FIG. 11, the controller 26 lowers the first design surface 62 by a predetermined distance d2 every time the lower key 42 is pressed once. However, the controller 26 maintains the position of the second design surface 63 without moving the second design surface 63 even when the raise key 41 is pressed. The controller 26 maintains the position of the second design surface 63 without moving the second design surface 63 even when the lower key 42 is pressed.

The predetermined distance d1 and the predetermined distance d2 may be different values. The predetermined distance d1 and the predetermined distance d2 may be optionally set by the operator.

In the aforementioned S105 of FIG. 5, the controller 26 controls the work implement 13 such that the blade tip position P0 of the work implement 13 moves along the target design surface 65.

As illustrated in FIG. 10, when a portion of the actual surface 50 is positioned above the target design surface 65, a portion 651 of the target design surface 65 may be modified such that the amount of the soil to be excavated by the work implement 13 is an appropriate value. In addition, when the inclination angle of the target design surface 65 is steep, a portion 652 of the target design surface 65 may be modified so that the inclination angle is gentle.

Figure 13:
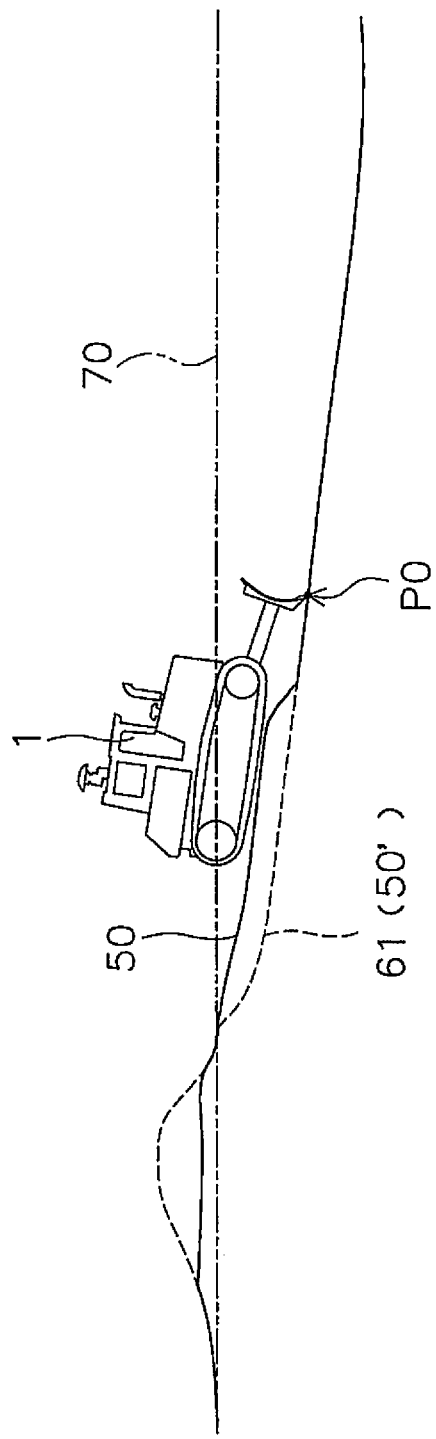
FIG. 13 illustrates an example of a design surface and an actual surface.
Figure 14:
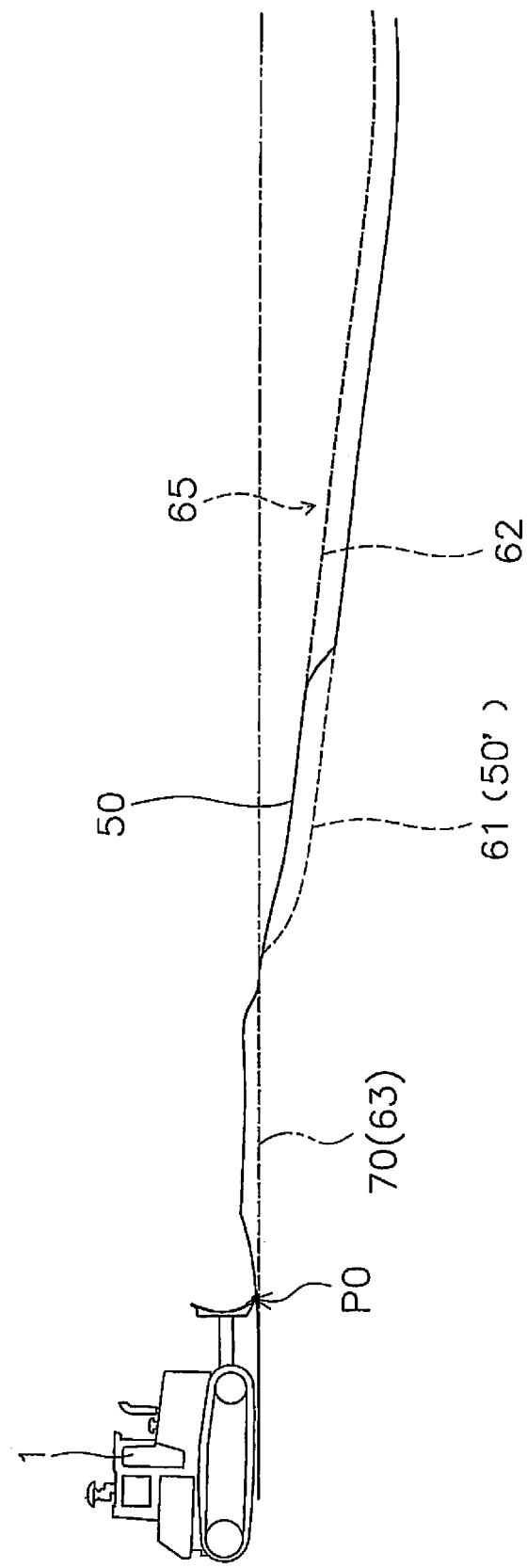
FIG. 14 illustrates an example of a design surface and an actual surface.
Figure 15:
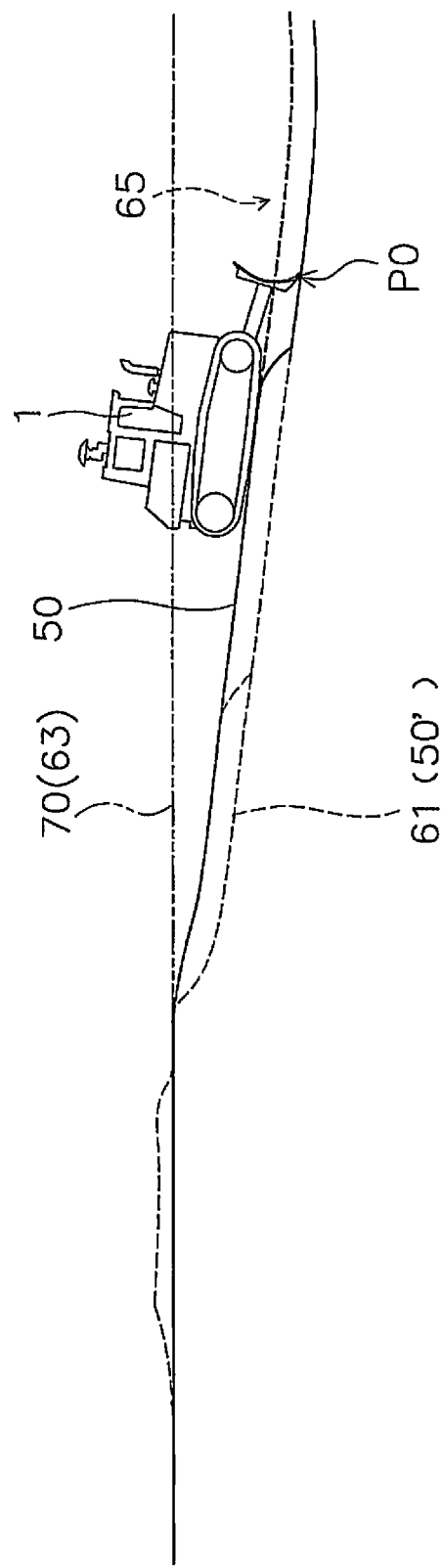
FIG. 15 illustrates an example of a design surface and an actual surface.

As described above, the offset design surface 64 is determined as the target design surface 65. As a result, as illustrated in FIG. 13, the soil is piled on an initial actual surface 50' and a new actual surface 50 is formed. Then, as illustrated in FIG. 14, the aforementioned processing is executed again when the work vehicle 1 moves in reverse for a predetermined distance and moves forward again. Provided that a series of the operations illustrated in FIG. 7 to FIG. 13 is defined as a first path, a series of the operations illustrated in FIG. 14 and FIG. 15 indicates a second path.

In the second path, the controller 26 also updates the actual topography data based on the changed actual surface 50. However, even when the actual surface 50 is changed, the controller 26 maintains the target design surface 65 as long as an offset instruction is not newly issued in step S206. Therefore, as illustrated in FIG. 14, the work implement 13 is controlled in accordance with the maintained target design surface 65.

Figure 16:
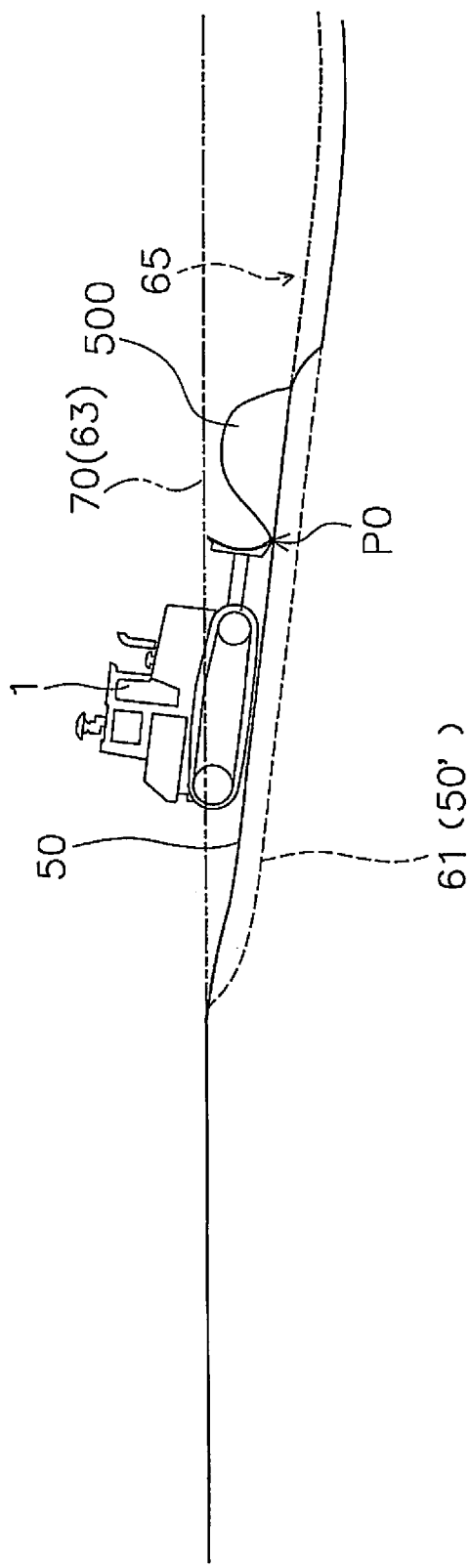
FIG. 16 illustrates an example of a design surface and an actual surface.
Figure 17:
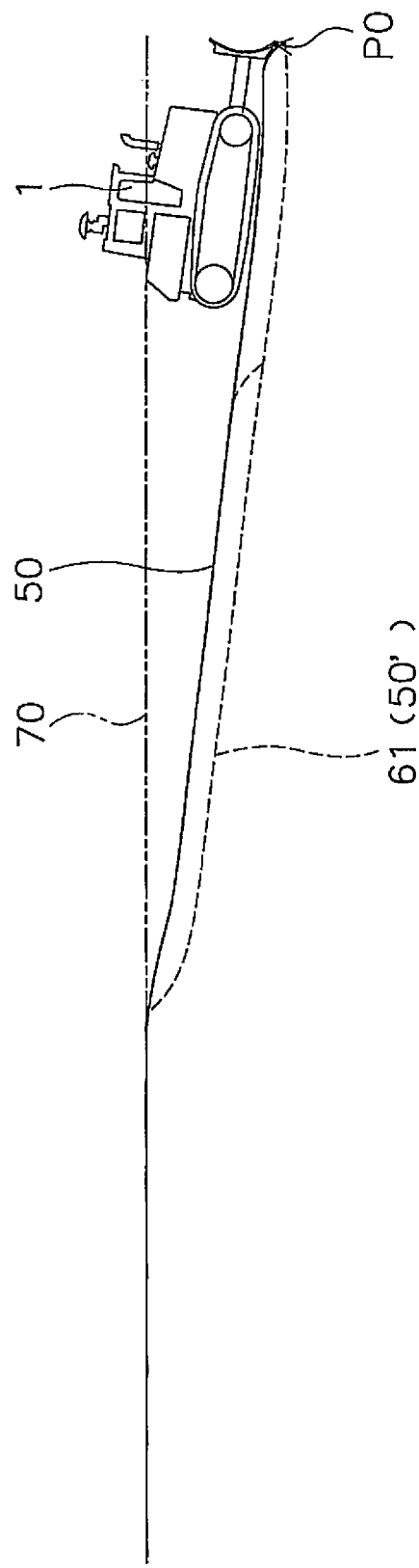
FIG. 17 illustrates an example of a design surface and an actual surface.

A series of the operations illustrated in the FIG. 16 and FIG. 17 indicates a third path. The aforementioned processing is also repeated in the third path. If there is no soil that can be removed with the work implement 13, the soil 500 may be transported by a dump truck or the like, as illustrated in FIG. 16. As in the second path, the controller 26 maintains the target design surface 65 as long as an offset instruction is not newly issued. Therefore, as illustrated in FIG. 16 and FIG. 17, the work implement 13 is controlled in accordance with the maintained target design surface 65. These operations are performed repeatedly whereby the soil is piled in layers along the target design surface 65. As a result, the soil is piled on the initial actual surface 50' and a new actual surface 50 is formed.

Figure 18:
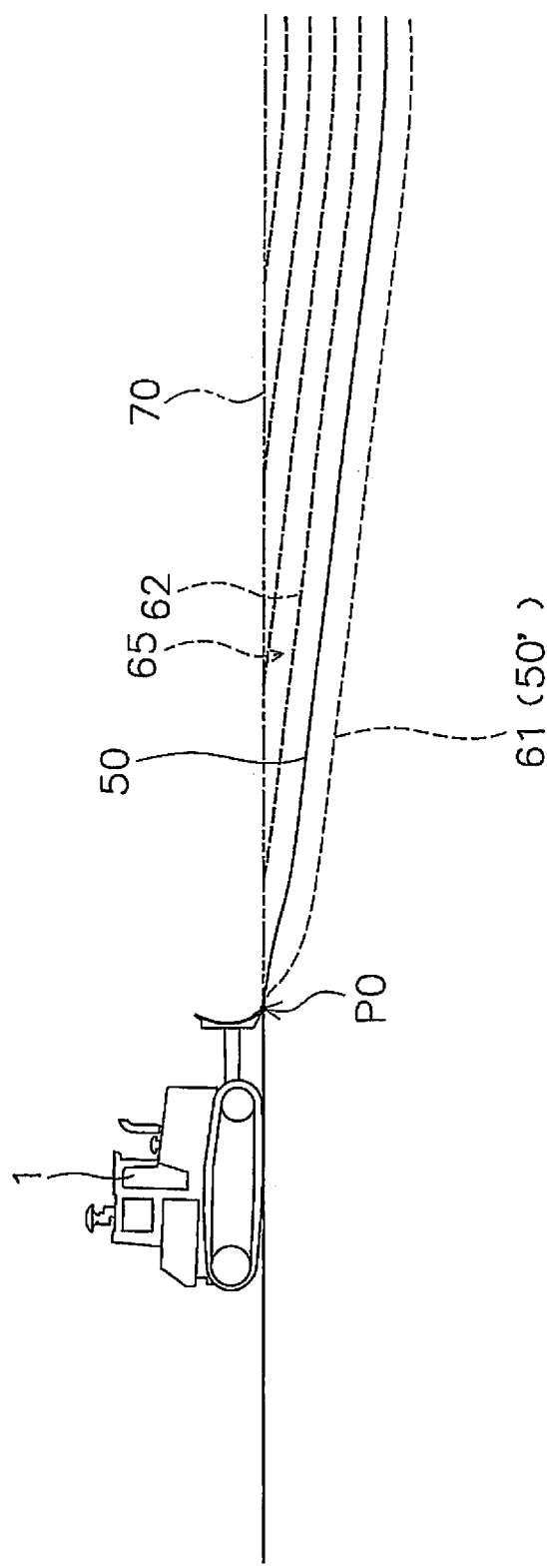
FIG. 18 illustrates an example of a design surface and an actual surface.

As illustrated in FIG. 18, when one layer is completed, the operator operates the raise key 41 to raise the target design surface 65. At this time, the controller 26 raises the first design surface 62 but maintains the position of the second design surface 63. As a result, a new target design surface 65 is determined. The controller 26 controls the work implement 13 along the newly determined target design surface 65. As a result, a subsequent layer is formed. By repeating such processes, the actual surface 50 gradually approaches the final design surface 70.

Even when the actual surface 50 is changed, the controller 26 maintains the initial actual design surface data as long as an instruction to update the actual design surface 61 is not issued. Therefore, the new target design surface 65 illustrated in FIG. 18 is a design surface acquired by displacing the initial actual design surface 61 upward by a predetermined distance using the initial actual design surface 61 as a reference. Therefore, even when the current actual surface 50 is changed, the shape of the target design surface 65 is maintained.

Figure 19:
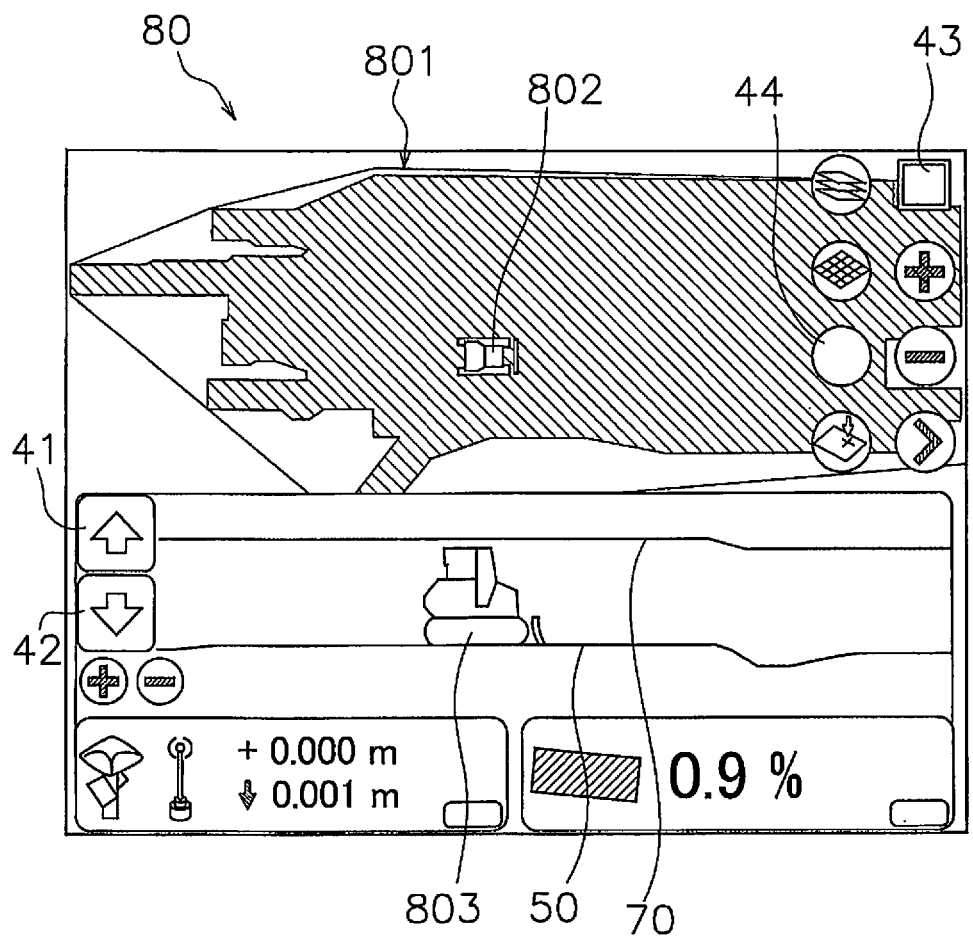
FIG. 19 illustrates an example of a view of an operating screen.

Next, the operating screens displayed on the display 25*c* and the operations by the input device 25*b* will be described. FIG. 19 illustrates an example of a view of an operating screen 80. As illustrated in FIG. 19, the operating screen 80 includes a top view that includes an image 801 indicating the topography of the work site and an icon 802 indicating the current position of the work vehicle 1. The operating screen 80 includes a side view that includes an image indicating the actual surface 50 and an icon 803 indicating the current position of the work vehicle 1. The side view may include an image indicating the final design surface 70. The operating screen 80 may include only the top view or the side view.

The operating screen 80 includes a plurality of operation keys 41-44. For example, the operating screen 80 includes the raise key 41 and the lower key 42 as described above. A key 43 for switching the operating screen 80 is also included.

Figure 20:
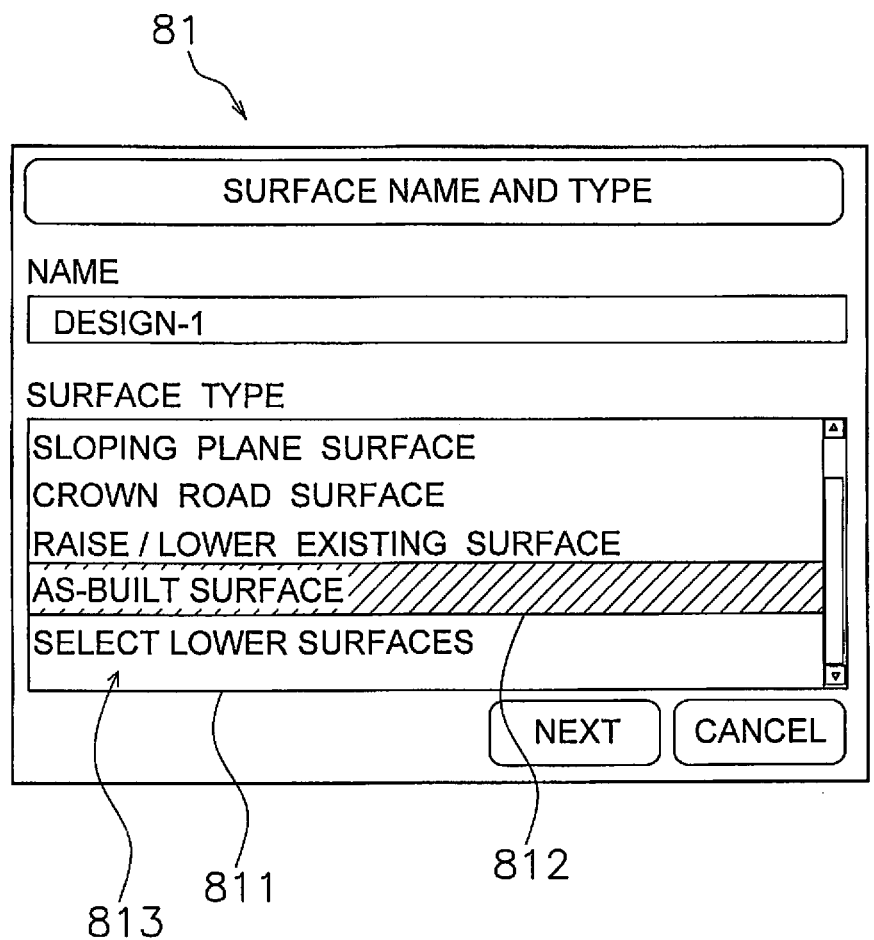
FIG. 20 illustrates an example of a view of an operating screen.

FIG. 20 illustrates an example of a view of an operating screen 81 for generating the design surface data. As illustrated in FIG. 20, the operating screen 80 includes a list 811 of a plurality of options indicating the types of the design surface 60 to be generated. The operator can select a desired option from the list 811 to generate design surface data, name the design surface data and store the design surface data in the storage device 28. For example, the design surfaces 60 of various types of shapes such as shapes including inclined planes, grooves or protrusions can be generated, and the design surface data thereof can be stored in the storage device 28.

Figure 21:
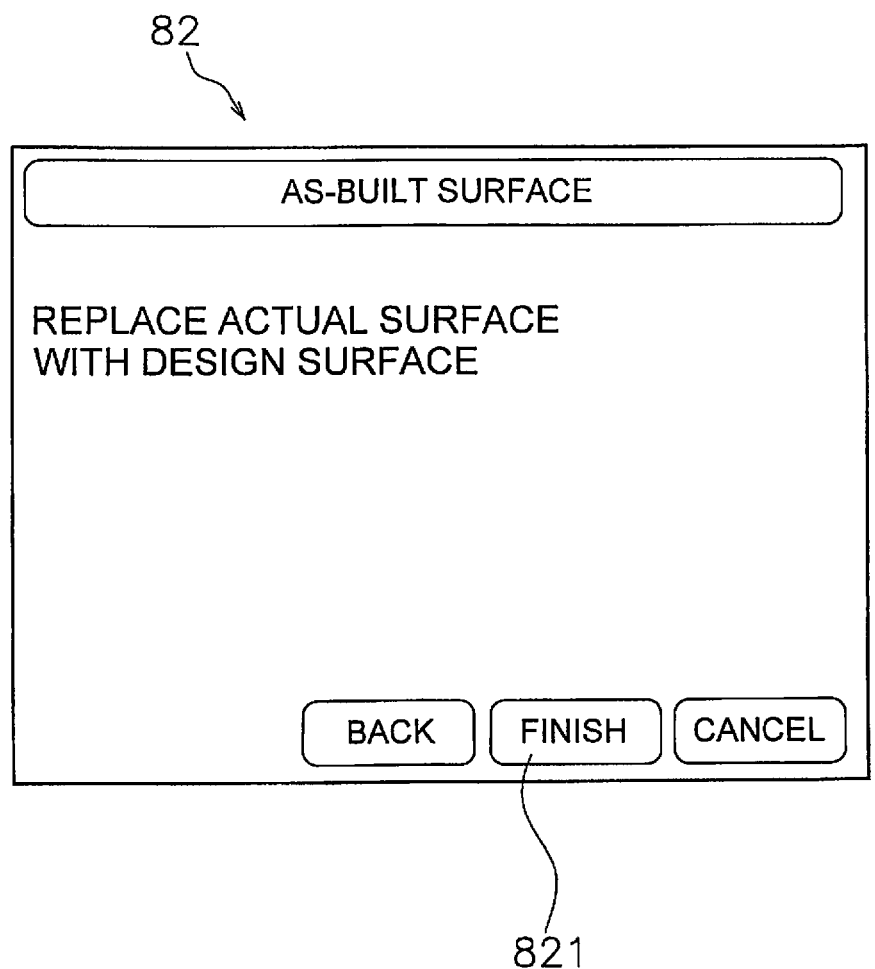
FIG. 21 illustrates an example of a view of an operating screen.

In addition, the list 811 includes an option 812 to generate the actual design surface 61. When this option 812 is selected, an operating screen 82 illustrated in FIG. 21 is displayed on a display 25c. When the operator presses a finish button 821 on the operating screen 82, the controller 26 determines that the instruction to generate the actual design surface 61 is issued in aforementioned step S201. As a result, the controller 26 replaces the current actual surface 50 with the actual design surface 61. The controller 26 generates the actual design surface data indicating the actual design surface 61 and stores the actual design surface data in the storage device 28.

Figure 22:
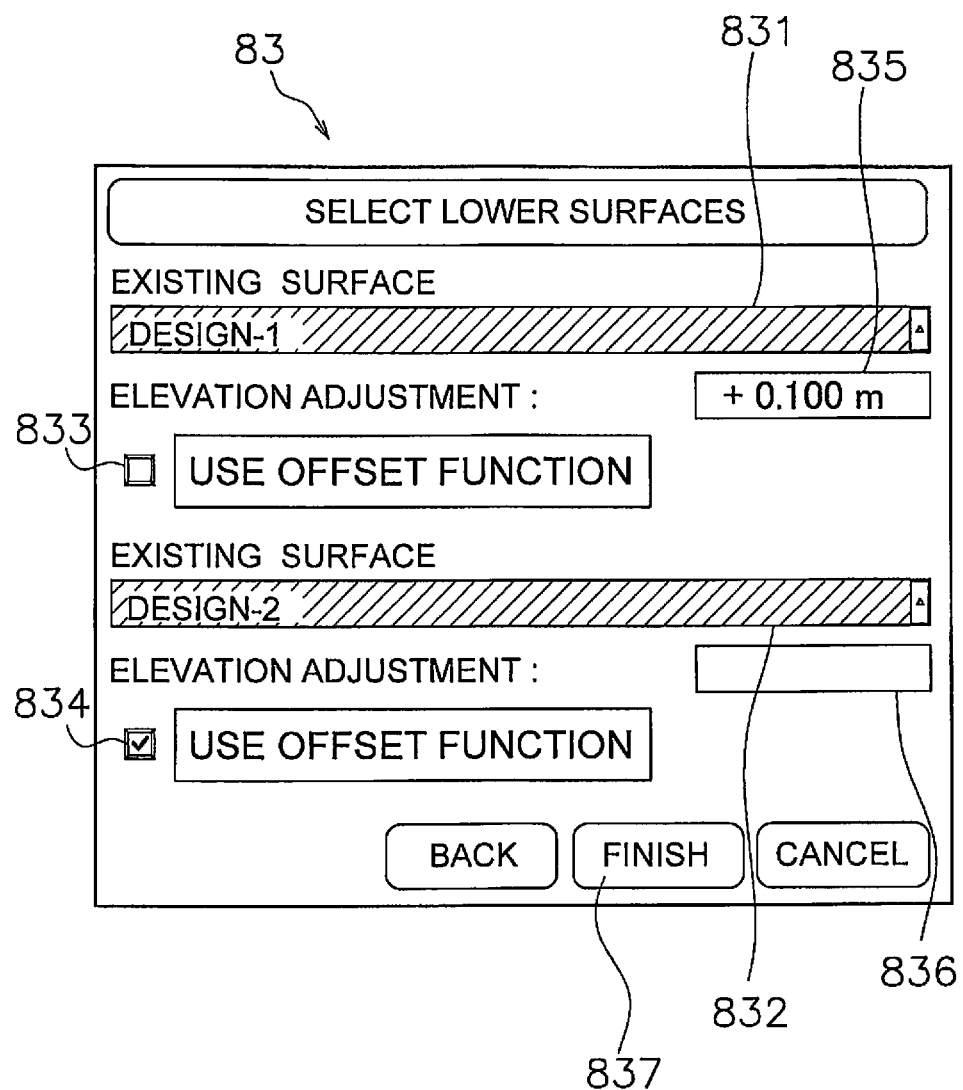
FIG. 22 illustrates an example of a view of an operating screen.

As illustrated in FIG. 20, the list 811 includes an option 813 to select lower portions from the plurality of the design surfaces 60 and 70 to generate the design surface 60. The aforementioned offset design surface 64 is generated by the option 813. When this option 813 is selected, an operating screen 83 illustrated in FIG. 22 is displayed on the display 25c. The list of the operating screen 81 may include an option to select higher portions from the plurality of design surfaces 60 and 70 to generate the offset design surface 64.

The operating screen 83 includes a function to select a first design surface 62 from the plurality of the design surfaces 60 and 70 and a function to select a second design surface 63 from the plurality of design surfaces 60 and 70. Specifically, the operating screen 83 includes a selection field 831 of the first design surface 62 and a selection field 832 of the second design surface 63. The operator can select desired design surfaces 60 and 70 as the first design surface 62 from the plurality of the design surfaces 60 and 70 displayed in the selection field 831 of the first design surface 62.

In addition, the operator can select a desired design surfaces 60 and 70 as the second design surface 63 from the plurality of the design surfaces 60 and 70 displayed in the selection field 832 of the second design surface 63. Therefore, while in the aforementioned offset design surface 64, the final design surface 70 is selected as the second design surface 63, in the operating screen 83, the operator can select the design surface 60 other than the final design surface 70 as the second design surface 63.

When the operator presses a finish button 837 on the operating screen 83, the offset design surface 64 is determined by selecting portions that are lower among portions of the first design surface 62 and the second design surface 63, and the design surface data indicating the offset design surface 64 is stored in the storage device 28, as in the aforementioned generation of the target design data.

The operating screen 83 includes a function to set whether or not the offset function can be used for the first design surface 62 and the second design surface 63. Specifically, the operating screen 83 includes an offset function setting filed 833 of the first design surface 62 and an offset function setting field 834 of the second design surface 63. When the operator sets the offset function of the first design surface 62 to be usable, the first design surface 62 is vertically displaced in response to the operation of the raise key 41 and the lower key 42. When the operator sets the offset function of the second design surface 63 to be usable, the second design surface 63 is vertically displaced in response to the operation of the raise key 41 and the lower key 42.

The aforementioned offset design surface 64 illustrated in FIG. 9 to FIG. 12 is a design surface when the offset function of the first design surface 62 is set to be usable and the offset function of the second design surface 63 is set to be unusable. When the offset function of the first design surface 62 and the offset function of the second design surface 63 are both set to be usable, the first design surface 62 and the second design are vertically displaced in response to the operation of the raise key 41 and the lower key 42. Alternatively, when the offset function of the first design surface 62 is set to be unusable and the offset function of the second design surface 63 is set to be usable, the second design surface 63 is vertically displaced in response to the operation of the raise key 41 and the lower key 42 and the position of the first design surface 62 is maintained. Therefore, the operator can optionally select, from the first design surface 62 and the second design surface 63, the design surface to be displaced in response to the operation of the raise key 41 and the lower key 42 on the operating screen 83.

The operating screen 83 includes a function to determine the amount of adjustment. Specifically, the operating screen 80 includes an adjustment amount setting field 835 of the first design surface 62 and an adjustment amount setting field 836 of the second design surface 63. When the offset function is set to be unusable, the amount of adjustment can be set. When the operator sets a value on the adjustment amount setting field 835 of the first design surface 62, the controller 26 maintains the first design surface 62 at the position vertically displaced by the amount of adjustment, even when the raise key 41 or the lower key 42 is operated. When the operator sets a value on the adjustment amount setting field 836 of the second design surface 63, the controller 26 maintains the second design surface 63 at the position vertically displaced by the amount of adjustment, even when the raise key 41 or the lower key 42 is operated.

When the operator presses the finish button 837 on the operating screen 83, the controller 26 generates the design surface data indicating the offset design surface 64 based on the setting on the operating screen 83.

Figure 23:
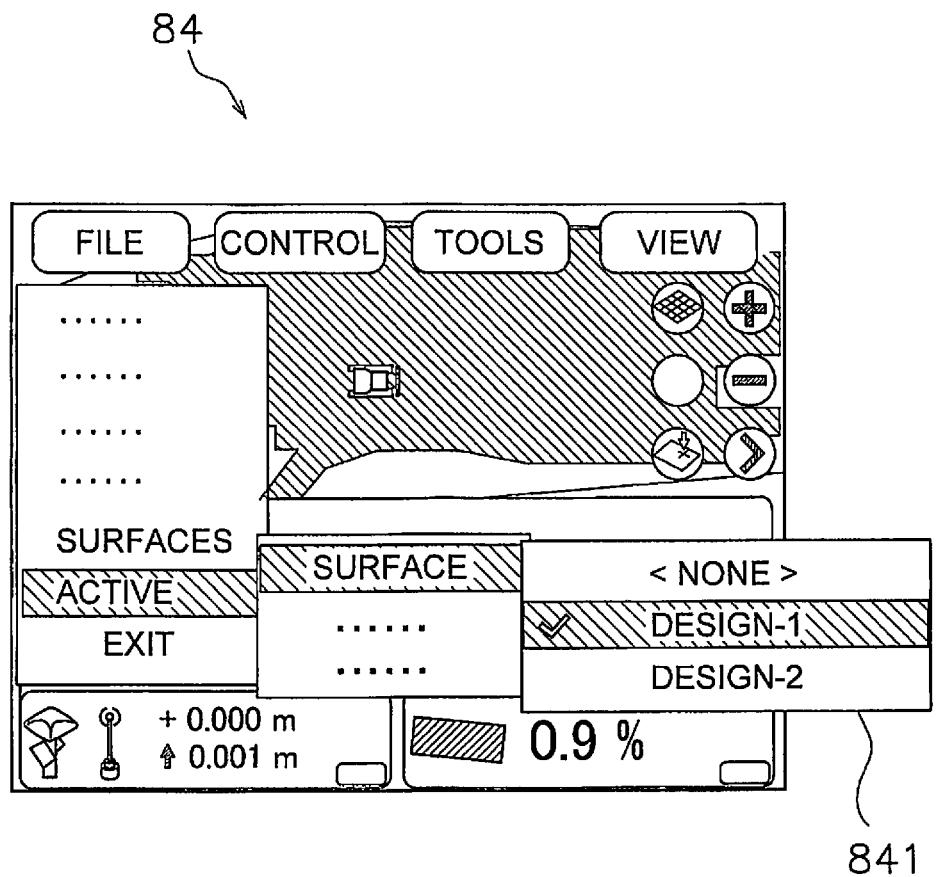
FIG. 23 illustrates an example of a view of an operating screen.

FIG. 23 illustrates an example of a view of an operating screen 84 to determine the target design surface 65. The operating screen 84 includes a list 841 of a plurality of stored design surface data. The operator selects design surface data of the design surfaces 60 and 70 to be switched to the "active" status, from the plurality of design surface data in the list 841. The controller 26 determines the "active" design surfaces 60 and 70 as the aforementioned target design surface 65.

The operator can use the aforementioned actual surface offset function by selecting the design surface data indicating the offset design surface 64 from the list 841. As described above, the operator can use the aforementioned actual surface offset function by operating the operating screens 81 to 84.

Figure 24:
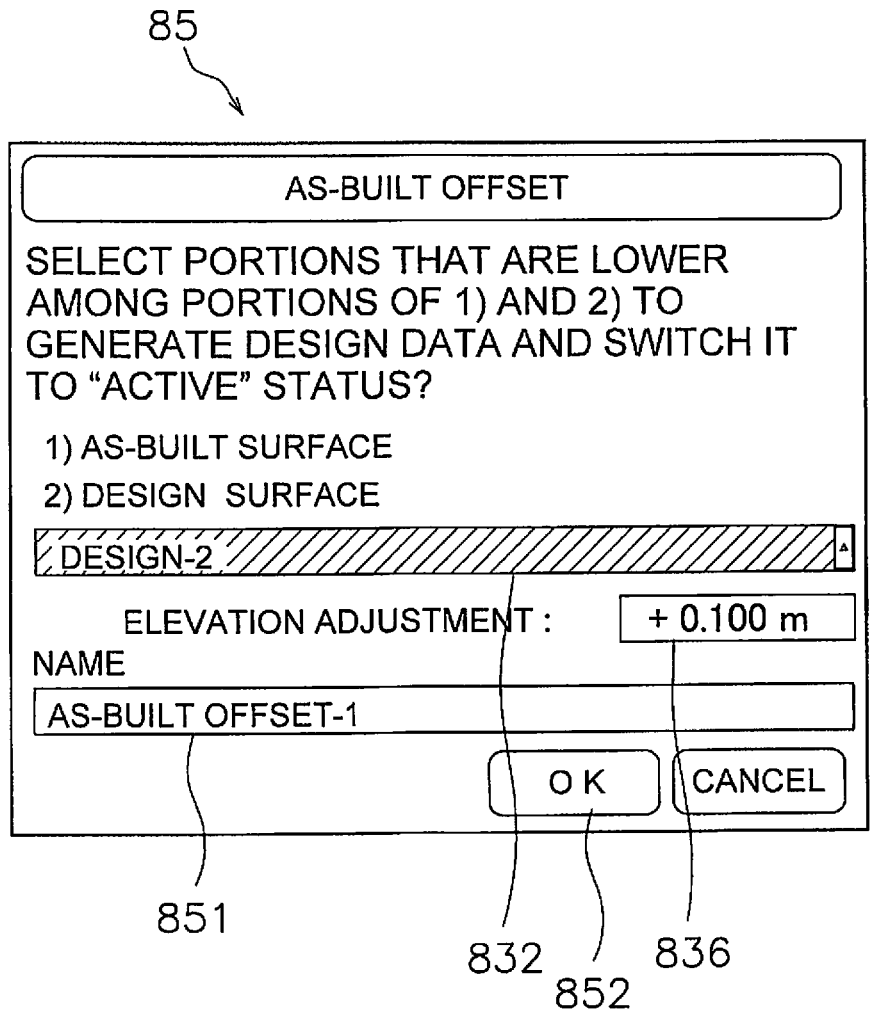
FIG. 24 illustrates an example of a view of an operating screen.

Further, the operating screen 80 illustrated in FIG. 19 includes a shortcut key 44 to more easily use the actual surface offset function. When the shortcut key 44 is pressed, an operating screen 85 of the actual surface offset function illustrated in FIG. 24 is displayed on the display 25c. The operating screen 85 includes a selection field 832 of the second design surface 63 and an adjustment amount setting field 836 of the second design surface 63.

In the operating screen 85, the actual surface 50 indicated by the most recent actual topography data is automatically set as the first design surface 62. Also, the offset function of the first design surface 62 is set to be usable, and the offset function of the second design surface 63 is automatically set to be unusable. The operating screen 85 includes a name field 851 of the offset design surface 64. A predetermined name is automatically input in the name field 851. However, the name field 851 can be manually input by the operator.

The operator selects the design surfaces 60 and 70 to be set as the second design surface 63 on the operating screen 85, and sets the adjustment amount of the second design surface 63. The adjustment amount may be zero. When the operator presses an OK button 852 on the operating screen

85, design surface data of the offset design surface 64 is generated and stored, and the generated offset design surface 64 is automatically switched to be in the "active" status. That is, when the operator presses the OK button 852 in the operating screen 80, the controller 26 determines the generated offset design surface 64 as the target design surface 65.

When the generated offset design surface 64 is determined as the target design surface 65, the image indicating the targets design surface 65 is displayed on the side view of the aforementioned operating screen 80. Then, when the target design surface 65 is vertically displaced by pressing the raise key 41 or the lower key 42, the image indicating the target design surface 65 in the side view is also vertically displaced.

Figure 25:
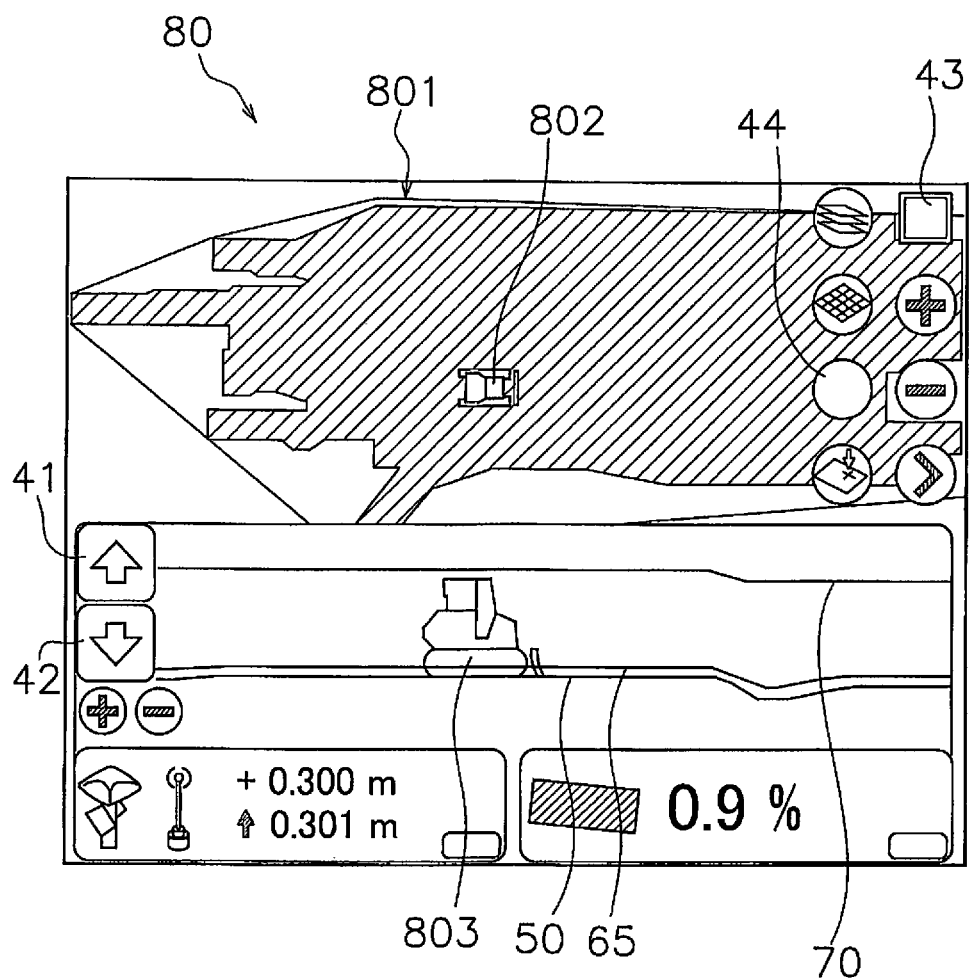
FIG. 25 illustrates an example of a view of an operating screen.

For example, the side view of the operating screen 80 illustrated in FIG. 25 includes an image indicating the target design surface 65 which has been raised by pressing the raise key 41. Every time the raise key 41 is pressed, the target design surface 65 raises by a predetermined amount. Along with that, the image indicating the target design surface 65 of the side view also raises by a predetermined amount. Similarly, every time the lower key 42 is pressed, the target design surface 65 is lowered by a predetermined amount. Along with that, the image indicating the target design surface 65 of the side view also lowers by a predetermined amount.

In the top view of the operating screen 80, the topography of the work site is indicated in different display modes according to the distance between the actual surface 50 and the target design surface 65. Therefore, the controller 26 displays the actual surface 50 which constitutes the topography of the work site in different modes for a portion higher than the target design surface 65 and a portion lower than the target design surface 65 in the top view.

Figure 26:
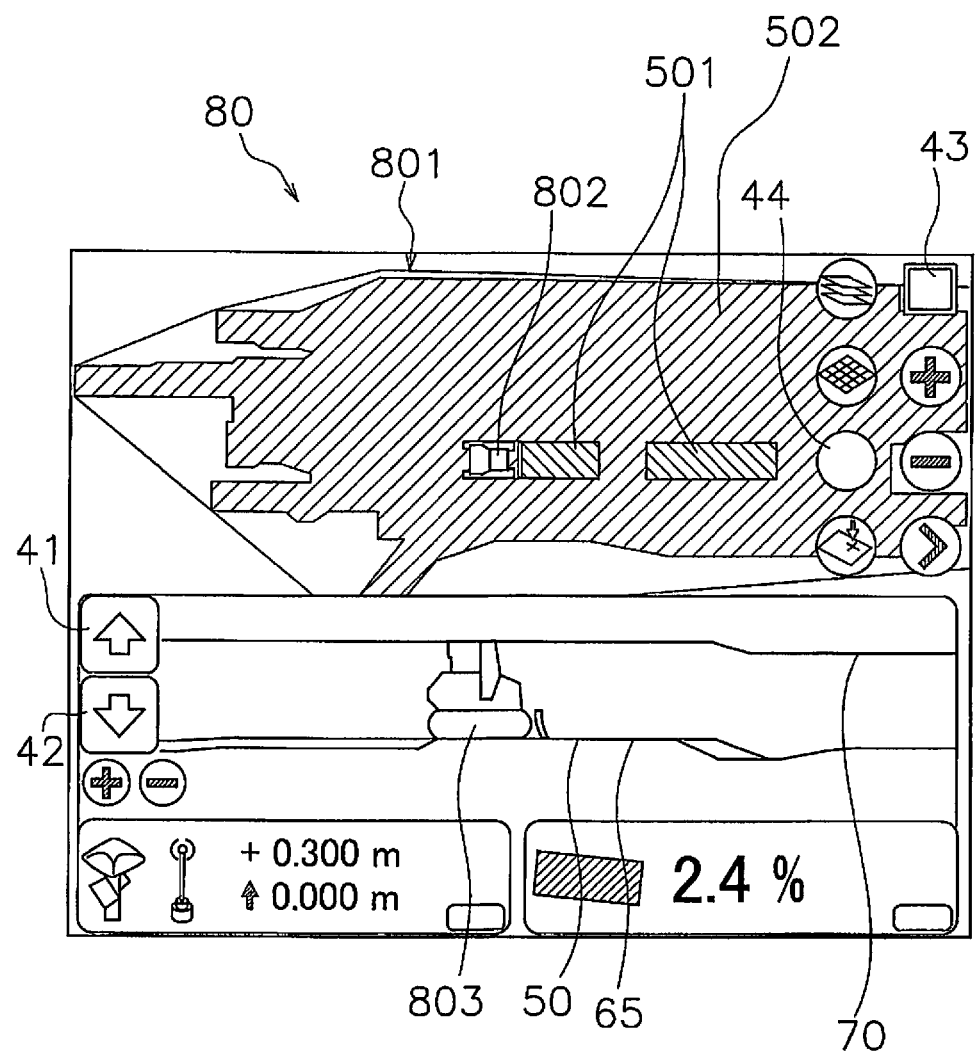
FIG. 26 illustrates an example of a view of an operating screen.

For example, the controller 26 displays the actual surface 50 in different colors according to the distance between the actual surface 50 and the target design surface 65. Therefore, as illustrated in FIG. 26, a portion 501 piled with the soil in the actual surface 50 is displayed in the top view in a color different from a portion 502 in which soil is not piled yet. Therefore, the operator can easily recognize in which portion of the actual surface 50 soil is not piled yet or in which portion the soil is not sufficiently piled by viewing the operating screen 80.

With the control system 3 of the work vehicle 1 according to the present embodiment described above, when the target design surface 65 is positioned above the actual surface 50, soil can be thinly piled on the actual surface 50 by controlling the work implement 13 along the target design surface 65. When the target design surface 65 is positioned below the actual surface 50, digging can be performed while suppressing excessive load to the work implement by controlling the work implement 13 along the target design surface 65. Accordingly, the quality of the finished work can be improved. Moreover, work efficiency can be improved by automatic control.

Further, the actual surface 50 can be set as the target design surface 65 by the actual surface offset function and can be easily displaced vertically. This allows the work to be performed efficiently.

Furthermore, even when the current actual surface 50 is changed, the shape of the target design surface data is maintained until the actual design surface 61 is updated. Therefore, for example, when the current actual surface 50 has unevenness, soil can be piled so that the unevenness is alleviated.

Although an embodiment of the present invention has been described so far, the present invention is not limited to the above embodiments and various modifications may be made within the scope of the invention.

The work vehicle 1 is not limited to the bulldozer, and may be another vehicle such as a wheel loader or a motor grader.

The work vehicle 1 may be remotely operable. In this case, a portion of the control system 3 may be disposed outside of the work vehicle 1. For example, the controller 26 may be disposed outside of the work vehicle 1. The controller 26 may be disposed inside a control center separated from the work site.

Figure 27:
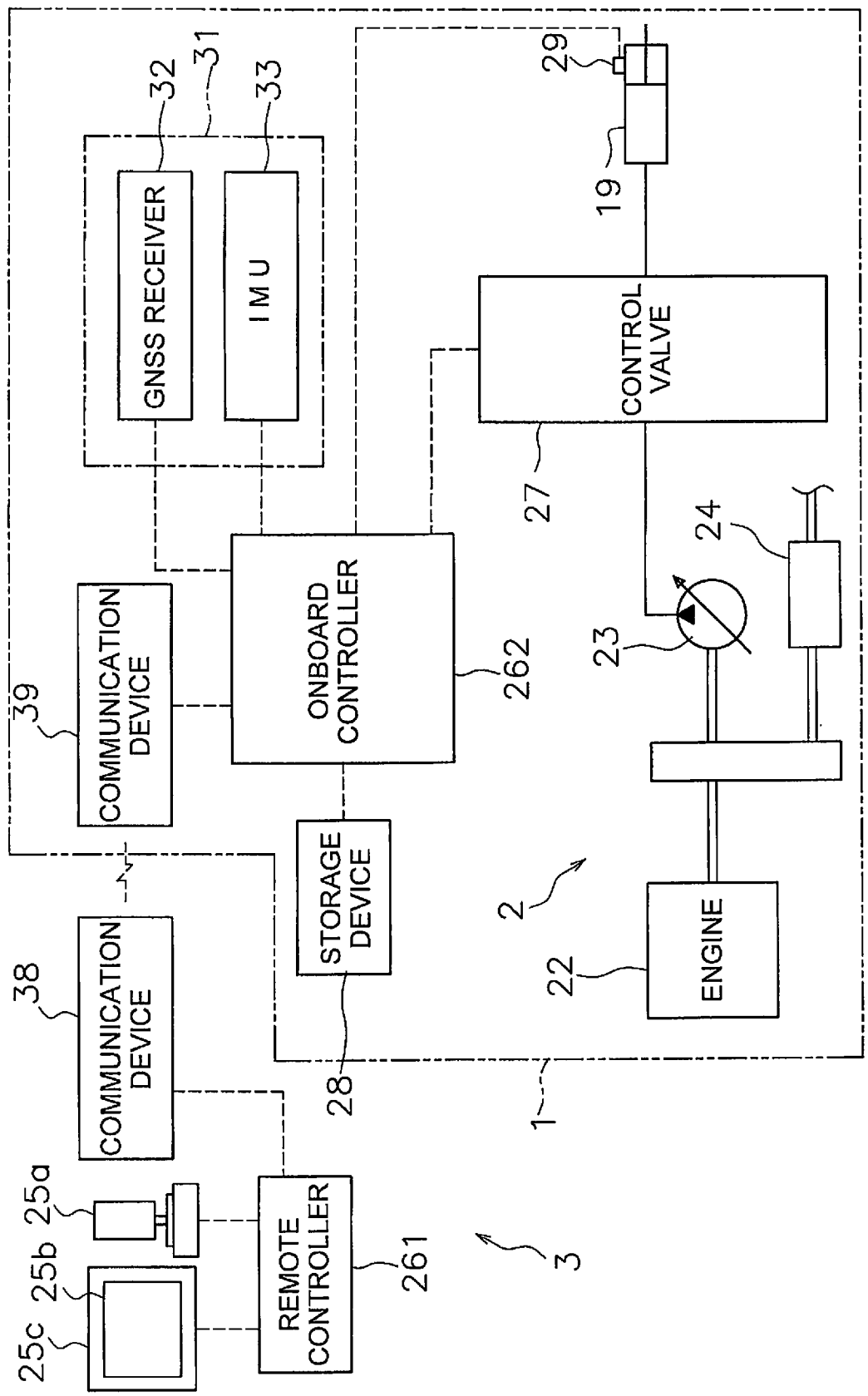
FIG. 27 is a block diagram of a configuration of a drive system and a control system of a work vehicle according to another embodiment.

The controller 26 may have a plurality of controllers separated from one another. For example, as illustrated in FIG. 27, the controller 26 may include a remote controller 261 disposed outside of the work vehicle 1 and an onboard controller 262 mounted on the work vehicle 1. The remote controller 261 and the onboard controller 262 may be able to communicate wirelessly via communication devices 38 and 39. Some of the aforementioned functions of the controller 26 may be executed by the remote controller 261, and the remaining functions may be executed by the onboard controller 262. For example, the processing for determining the design surfaces 60 and 70 may be performed by the remote controller 261, and the processing for outputting command signals for the work implement 13 may be performed by the onboard controller 262.

The operating device 25a, the input device 25b, and the display 25c may be disposed outside of the work vehicle 1. In this case, the operating cabin may be omitted from the work vehicle 1. Alternatively, the operating device 25a, the input device 25b, and the display 25c may be omitted from the work vehicle 1. The work vehicle 1 may be operated with only the automatic control by the controller 26 without operations by the operating device 25a and the input device 25b.

Figure 28:
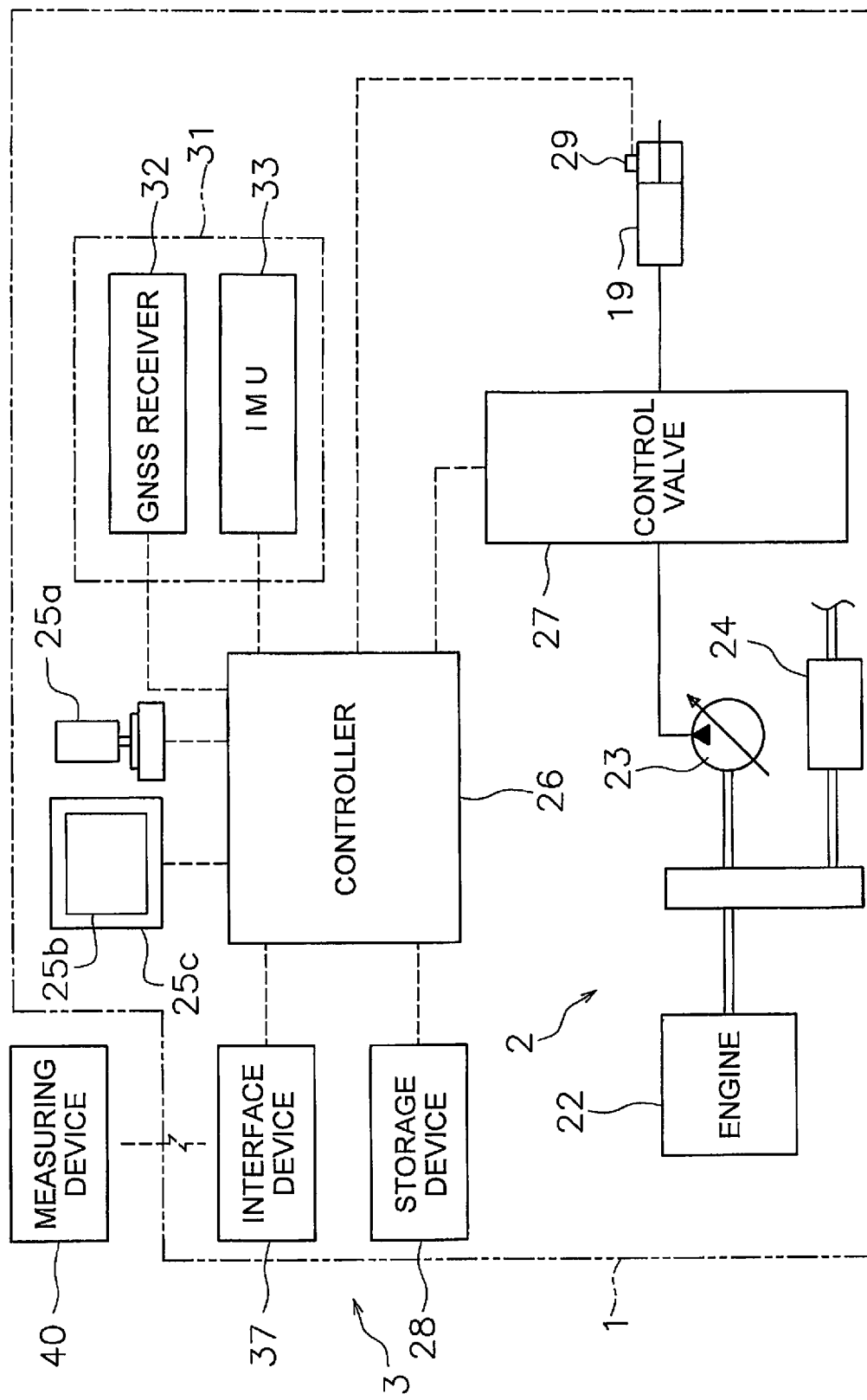
FIG. 28 is a block diagram of a configuration of a drive system and a control system of a work vehicle according to another embodiment.
Figure 29:
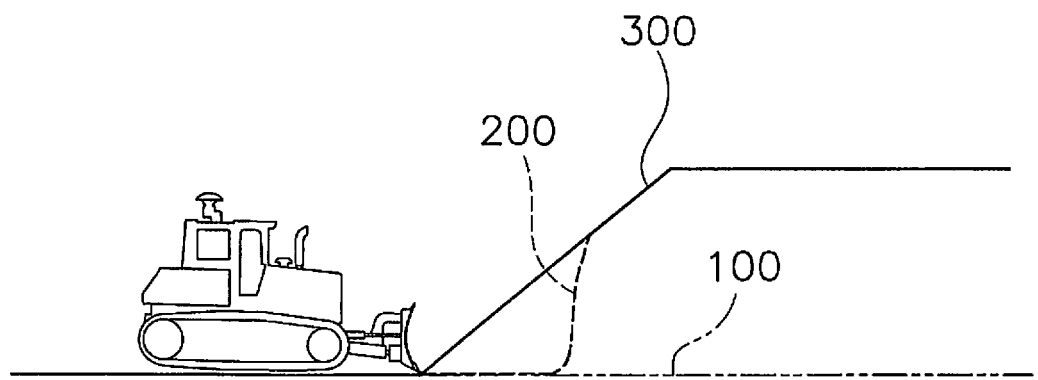
FIG. 29 illustrates is an example according to the related art.
Figure 30:
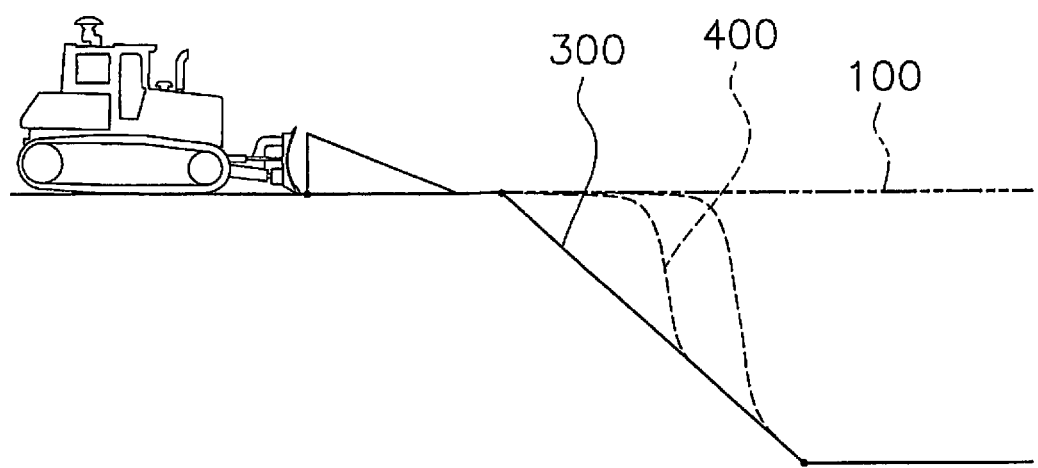
FIG. 30 illustrates is an example according to the related art.

The actual surface 50 may be acquired not only by the aforementioned position sensing device 31 but also by another device. For example, as illustrated in FIG. 28, the actual surface 50 may be acquired by the interface device 37 that receives data from external devices. The interface device 37 may wirelessly receive actual topography data measured by an external measuring device 40. Alternatively, the interface device 37 may be a recording medium reading device and may receive the actual topography data measured by the external measuring device 40 via a recording medium.

The controller 26 may determine the design surface 60 based on the smoothed actual surface 50. The term "smoothing" means processing to smooth the variations in the height of the actual surface 50. For example, the controller 26 may smooth the heights Z0 to Zn at a plurality of points on the actual surface 50 according to the following formula 1.

$$Z_{n\_sm} = (\Sigma_{k=n-2}^{n+2} Z_k)/5 \quad \text{[Formula 1]}$$

Zn_sm indicates the height of each point on the smoothed actual surface 50. In Formula 1, smoothing is performed with the average height at five points. However, the number of points used for smoothing may be less than five, or may be greater than five. The number of points used for smoothing can be varied, and the operator can set the desired degree of smoothing by changing the number of points to be used for smoothing. Also, the average to be calculated is not limited to the average of the height of the points to be smoothed and points ahead and behind, but also the average of the height of the points to be smoothed and points located in front. Alternatively, the average of the height of a point to be smoothed and points located behind may be calculated. Alternatively, some other smoothing processing may be used, instead of the one based on the average.

An offset design surface 64 generated from the smoothed actual surface 50 may be determined as the target design surface 65 without being vertically displaced. In this case, filling or digging can be performed so that the current actual surface 50 with large unevenness has the same shape as the smoothed actual surface 50.

The input device 25b is not limited to a touch panel device, and may be a device such as a switch. The aforementioned operation keys 41 to 44 are not limited to the software keys displayed on the touch panel, and may be hardware keys.

The present invention provides a control system for a work vehicle, a method for setting the trajectory of a work implement, and a work vehicle that enables work with high efficiency and high quality finish under automatic control.

What is claimed is:

1. A control system for a work vehicle including a work implement, the control system comprising:
   an input device configured to issue an operation signal indicating an offset instruction in response to being operated by a user; and
   a controller arranged to communicate with the input device and programmed to
      acquire actual topography data indicating an actual surface of a work target,
      generate a target design surface, and
      vertically displace at least a portion of the target design surface in response to the operation signal.

2. The control system for a work vehicle according to claim 1, wherein
   the controller is further configured to
      set the actual surface as a first design surface,
      determine the target design surface to include at least a portion of the first design surface and to indicate a target trajectory of the work implement, and
      maintain the target design surface even when the actual topography data indicating the actual surface is changed due to excavation work as long as the operation signal indicating the offset instruction is not issued.

3. The control system for a work vehicle according to claim 2, wherein
   the controller is further configured to
      acquire second design surface data indicating a second design surface, and
      determine the target design surface by selecting and combining portions that are lower among portions of the first design surface and the second design surface.

4. The control system for a work vehicle according to claim 1, wherein
   the controller is configured to
      smooth the actual topography data, and
      determine the target design surface based on the smoothed actual topography data.

5. The control system for a work vehicle according to claim 1, wherein
   the controller is further configured to vertically displace at least the portion of the target design surface by a predetermined distance in response to the operation signal.

6. The control system of a work vehicle according to claim 1, further comprising:
   a display,
      the controller being configured to output a signal to display an image indicating the target design surface on the display.

7. The control system of a work vehicle according to claim 1, wherein
   the controller is configured to control the work implement according to the target design surface.

8. The control system for a work vehicle according to claim 1, wherein
   the input device includes a raise key and a lower key, and
   the controller is further configured to raise at least the portion of the target design surface by a first predetermined distance in response to an operation of the raise key, and to lower at least the portion of the target design surface by a second predetermined distance in response to an operation of the lower key.

9. The control system for a work vehicle according to claim 2, wherein
   the controller is configured to set the first design surface as the portion of the target design surface to be vertically displaced in response to the operation signal.

10. The control system for a work vehicle according to claim 3, wherein
    the controller is configured to selectively set a first portion of the target design surface corresponding to the first design surface, a second portion of the target design surface corresponding to the second design surface, or both the first portion and the second portion as the portion of the target design surface to be vertically displaced in response to the operation signal.

11. The control system of a work vehicle according to claim 10, wherein
    the controller is configured to receive a request from the user to set the first portion, the second portion, or both the first portion and the second portion as the portion of the target design surface to be vertically displaced in response to the operation signal.

12. A method for setting a target trajectory of a work implement of a work vehicle, the method comprising:
    acquiring actual topography data indicating an actual surface of a work target;
    generating a target design;
    receiving an operation signal indicating an offset instruction from an input device; and
    vertically displacing at least a portion of the target design surface in response to the operation signal.

13. The method for setting a target trajectory of a work implement according to claim 12, the method further comprising:
    setting the actual surface as a first design surface; and
    determining the target design surface to include at least a portion of the first design surface and to indicate a target trajectory of the work implement; and
    maintaining the target design surface even when the actual surface is changed due to excavation work as long as the operation signal indicating the offset instruction is not issued.

14. The method for setting a target trajectory of a work implement according to claim 13, the method further comprising:
    acquiring second design surface data indicating a second design surface,
    the target design surface being determined by selecting and combining portions that are lower among portions of the first design surface and the second design surface.

15. The method for setting a target trajectory of a work implement according to claim 12, the method further comprising:
   smoothing the actual topography data,
   the target design surface being determined based on the smoothed actual topography data.

16. The method for setting a target trajectory of a work implement according to claim 12, wherein
   at least the portion of the target design surface is vertically displaced by a predetermined distance in response to the operation signal.

17. The method for setting a target trajectory of a work implement according to claim 12, the method further comprising:
   displaying the target design surface on a display.

18. A work vehicle comprising:
   a work implement;
   an input device configured to issue an operation signal indicating an offset instruction in response to being operated by a user; and
   a controller arranged to communicate with the input device and programmed to
      acquire actual topography data indicating an actual surface of a work target,
      generate a target design surface, and
      vertically displace at least a portion of the target design surface in response to the operation signal.

19. The work vehicle according to claim 18, wherein the controller is configured to
   set the actual surface as a first design surface,
   determine the target design surface to include at least a portion of the first design surface and indicating to indicate a target trajectory of the work implement,
   control the work implement according to the target design surface, and
   maintain the target design surface even when the actual surface is changed due to excavation work as long as the operation signal indicating the offset instruction is not issued.

20. The work vehicle according to claim 19, wherein the controller is further configured to
   acquire second design surface data indicating a second design surface, and
   determine the target design surface by selecting and combining portions that are lower among portions of the first design surface and the second design surface.

* * * * *